US012768655B2

(12) United States Patent
Balsam et al.

(10) Patent No.: US 12,768,655 B2
(45) Date of Patent: Oct. 20, 2026

(54) GUIDING A USER OF AN ARTIFICIAL REALITY SYSTEM TO A PHYSICAL OBJECT HAVING A TRACKABLE FEATURE USING SPATIAL AUDIO CUES

(71) Applicant: Meta Platforms Technologies, LLC, Menlo Park, CA (US)

(72) Inventors: Nava K. Balsam, Woodinville, WA (US); Khia Johnson, Seattle, WA (US); Haniyeh Salehi, Statesville, NC (US); Ishwarya Ananthabhotla, Cambridge, MA (US); Antje Ihlefeld, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 423 days.

(21) Appl. No.: 18/122,073

(22) Filed: Mar. 15, 2023

(65) Prior Publication Data

US 2024/0310175 A1 Sep. 19, 2024

(51) Int. Cl.
*G01C 21/20* (2006.01)
*G06V 10/774* (2022.01)
(Continued)

(52) U.S. Cl.
CPC ......... *G01C 21/206* (2013.01); *G06V 10/945* (2022.01); *G06V 20/20* (2022.01);
(Continued)

(58) Field of Classification Search
CPC .... G01C 21/206; G01C 21/20; G06V 10/945; G06V 20/20; G06V 20/40; G06V 10/774;
(Continued)

(56) References Cited

U.S. PATENT DOCUMENTS 6,684,176 B2 * 1/2004 Willins .................... G01S 5/06 340/988
11,089,438 B2 8/2021 De La Broise et al.
(Continued)

FOREIGN PATENT DOCUMENTS

WO WO-2019126236 A1 6/2019

OTHER PUBLICATIONS

European Search Report for European Patent Application No. 24157373.2, dated Jul. 25, 2024, 8 pages.

*Primary Examiner* — Anne Marie Antonucci
*Assistant Examiner* — Luis G Del Valle
(74) *Attorney, Agent, or Firm* — Greenberg Traurig, LLP

(57) ABSTRACT

An artificial reality system receives information identifying a physical object and location information describing a geographical location associated with the artificial reality system, in which the information identifying the physical object includes a trackable feature associated with the physical object. Upon receiving a request from a user to locate the physical object, the artificial reality system determines a most recent geographical location associated with the physical object based at least in part on the trackable feature and the location information. The artificial reality system then communicates a set of spatial audio cues to the user, in which the set of spatial audio cues guides the user to the most recent geographical location associated with the physical object.

20 Claims, 8 Drawing Sheets

(51) Int. Cl.

| | |
|---|---|
| ***G06V 10/94*** | (2022.01) |
| ***G06V 20/20*** | (2022.01) |
| ***G06V 20/40*** | (2022.01) |
| ***H04S 7/00*** | (2006.01) |

(52) U.S. Cl.
CPC .............. *G06V 20/40* (2022.01); *H04S 7/303* (2013.01); *G06V 10/774* (2022.01)

(58) Field of Classification Search
CPC ........ H04S 7/303; H04W 4/029; G06F 3/013; G06F 3/0346; G06F 3/16; G06N 20/00
See application file for complete search history.

(56) References Cited

U.S. PATENT DOCUMENTS

| | | | | |
|---|---|---|---|---|
| 11,423,583 | B2 * | 8/2022 | Kwatra | G06F 18/251 |
| 2019/0282324 | A1 * | 9/2019 | Freeman | A61B 1/05 |
| 2019/0348041 | A1 * | 11/2019 | Cella | G10L 15/02 |
| 2020/0117899 | A1 * | 4/2020 | Rogness | B60R 1/29 |
| 2021/0051440 | A1 * | 2/2021 | de la Broise | G01S 13/46 |
| 2021/0081166 | A1 * | 3/2021 | Acciarri | G02B 27/017 |
| 2022/0058437 | A1 * | 2/2022 | Soni | G06N 3/08 |

* cited by examiner

GUIDING A USER OF AN ARTIFICIAL REALITY SYSTEM TO A PHYSICAL OBJECT HAVING A TRACKABLE FEATURE USING SPATIAL AUDIO CUES

BACKGROUND

This disclosure relates generally to artificial reality systems, and more specifically to guiding a user of an artificial reality system to a physical object having a trackable feature using spatial audio cues.

When physical objects (e.g., car keys, phones, wallets, remote controls, etc.) are lost or misplaced, several techniques are commonly used to locate them. For example, if a physical object was recently in an individual's possession, the individual may retrace their steps and look for the object as they do so. As an additional example, an individual may think about their location the last time they saw a physical object they have lost or misplaced and look for it at the location. As yet another example, if an individual is searching for a mobile device and the device has a remote locating application installed on it, the application may allow the individual to view location information for the device on another device (e.g., a laptop computer).

However, these techniques may be inefficient and/or ineffective for various reasons. For example, an individual may have difficulty remembering the last time they saw a physical object they have lost or misplaced or it may take a long time for the individual to retrace their steps if they were recently at several different locations. As an additional example, if a remote locating application is being used to locate a mobile device, the location information for the device may not be available for various reasons (e.g., no signal is available, the device is not turned on or has run out of batteries, access to another device to view the location information is not available, login credentials required by the application are not available, etc.). Furthermore, in the above example, even if the location information for the device is available, this information may not be that helpful if the location information is an approximate location that covers a large area (e.g., an area with a 20-meter radius).

SUMMARY

To help locate physical objects, an artificial reality system guides a user to a physical object having a trackable feature using spatial audio cues. More specifically, the artificial reality system receives information identifying the physical object and location information describing a geographical location associated with the artificial reality system, in which the information identifying the physical object includes the trackable feature associated with the physical object. Upon receiving a request from the user to locate the physical object, the artificial reality system determines a most recent geographical location associated with the physical object based at least in part on the trackable feature and the location information. The artificial reality system then communicates a set of spatial audio cues to the user, in which the set of spatial audio cues guides the user to the most recent geographical location associated with the physical object.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments of the invention may include or be implemented in conjunction with an artificial reality system. Artificial reality is a form of reality that has been adjusted in some manner before presentation to a user, which may include, for example, virtual reality (VR), augmented reality (AR), mixed reality (MR), hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (e.g., stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. An artificial reality system that provides artificial reality content may be implemented on various platforms, including a wearable device (e.g., a headset) connected to a host computer system, a standalone wearable device (e.g., a headset), a mobile device or computing system, or any other hardware platform capable of providing artificial reality content to one or more viewers.

Figure 1:
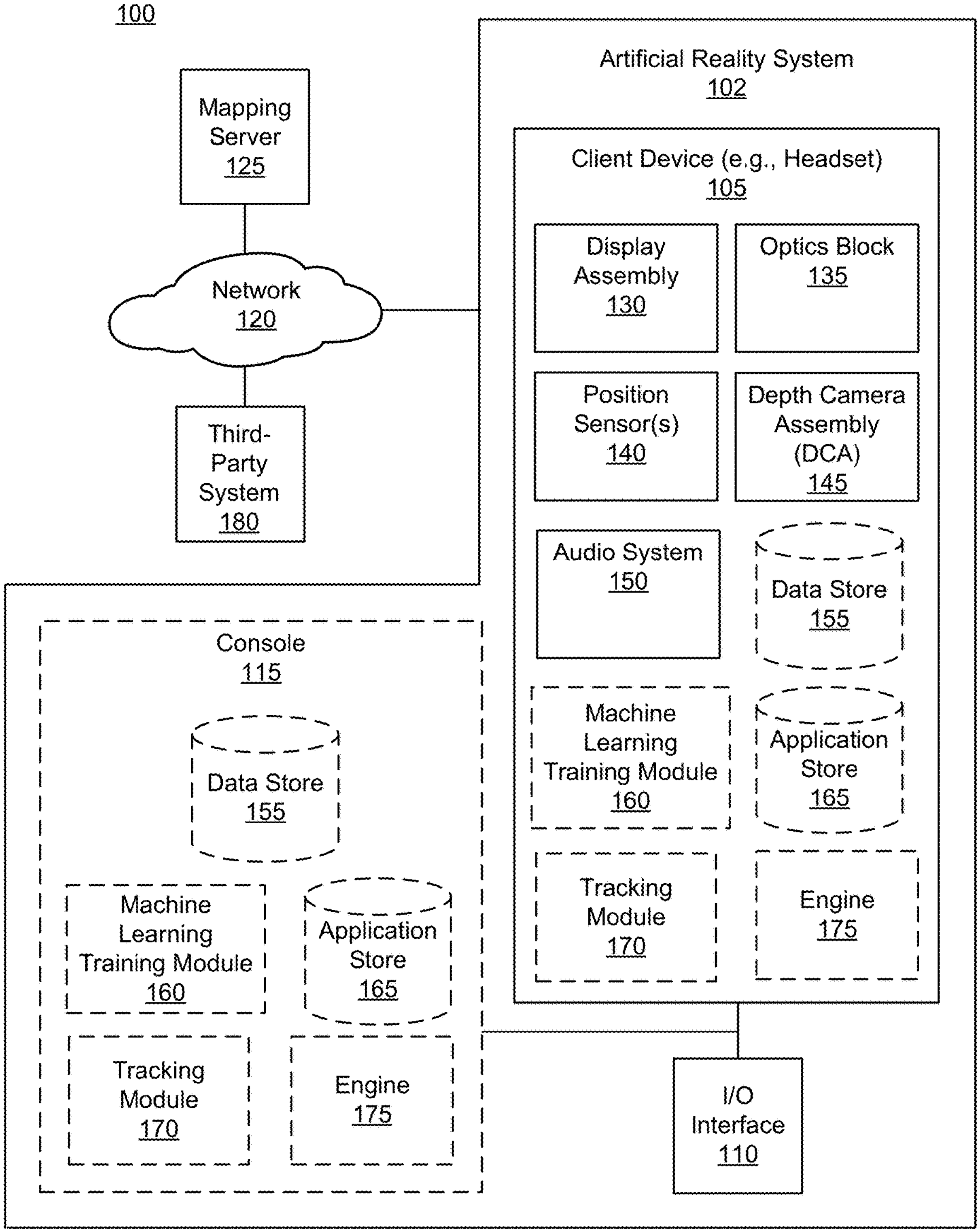
FIG. 1 is a block diagram of a system that includes an artificial reality system, in accordance with one or more embodiments.

FIG. 1 is a block diagram of a system 100 that includes an artificial reality system 102, in accordance with one or more embodiments. The system 100 may operate in an artificial reality environment (e.g., a virtual reality environment, an augmented reality environment, a mixed reality environment, or some combination thereof). The system 100 shown in FIG. 1 includes an artificial reality system 102 that includes a client device 105 (e.g., a headset), an input/output (I/O) interface 110, and a console 115 that are coupled to each other, as well as a network 120, a mapping server 125, and a third-party system 180. While FIG. 1 shows an example system 100 including one artificial reality system 102 that includes one client device 105 and one I/O interface 110, in other embodiments, any number of these components may be included in the system 100. For example, there may be multiple artificial reality systems 102, some including multiple client devices 105 (e.g., headsets) each having an associated I/O interface 110, with each client device 105 and I/O interface 110 communicating with a console 115. In alternative configurations, different and/or additional components may be included in the system 100. Additionally, functionality described in conjunction with one or more of the components shown in FIG. 1 may be distributed among the components in a different manner than described in conjunction with FIG. 1 in some embodiments. For example, some or all of the functionality of the console 115 may be provided by the client device 105.

The artificial reality system 102 may be a virtual reality system, an augmented reality system, a mixed reality system, or some combination thereof. While FIG. 1 shows an example artificial reality system 102 including one client device 105, one I/O interface 110, and one console 115, in other embodiments, different numbers of these components may be included in the artificial reality system 102. For example, there may be multiple client devices 105 (e.g., headsets) each having an associated I/O interface 110, with each client device 105 and I/O interface 110 communicating with the console 115. In alternative configurations, different and/or additional components may be included in the artificial reality system 102. For example, the artificial reality system 102 may only include one client device 105 and one I/O interface 110. Additionally, in other embodiments, the functionality provided by various components described in conjunction with FIG. 1 may be distributed differently among the components of the artificial reality system 102 or be captured in separate assemblies remote from the artificial reality system 102.

The client device 105 may be a wearable device (e.g., a headset), a mobile device (e.g., a smartphone or a tablet), a computing system (e.g., a desktop or a laptop computer), or any other device capable of providing artificial reality content to one or more users. As shown in FIG. 1, in some embodiments, the client device 105 includes a display assembly 130, an optics block 135, one or more position sensors 140, a depth camera assembly (DCA) 145, an audio system 150, a data store 155, a machine learning training module 160, an application store 165, a tracking module 170, and an engine 175. Some embodiments of the client device 105 have different components than those described in conjunction with FIG. 1. Additionally, the functionality provided by various components described in conjunction with FIG. 1 may be distributed differently among the components of the client device 105 in other embodiments, or be captured in separate assemblies remote from the client device 105. In some embodiments, the client device 105 may be the client device 105A of FIG. 2A or the client device 105B of FIG. 2B described below.

The display assembly 130 displays content to the user in accordance with data received from the console 115. The display assembly 130 displays the content using one or more display elements. For example, a display element may be an electronic display. In various embodiments, the display assembly 130 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, a display element may also include some or all of the functionality of the optics block 135.

The optics block 135 may magnify image light received from the electronic display, correct optical errors associated with the image light, and present the corrected image light to one or both eyeboxes of the client device 105. The eyebox is a location in space that an eye of a user occupies while using the client device 105. In various embodiments, the optics block 135 includes one or more optical elements. Example optical elements included in the optics block 135 include: an aperture, a Fresnel lens, a convex lens, a concave lens, a filter, a reflecting surface, or any other suitable optical element that affects image light. Moreover, the optics block 135 may include combinations of different optical elements. In some embodiments, one or more of the optical elements in the optics block 135 may have one or more coatings, such as partially reflective or anti-reflective coatings.

Magnification and focusing of the image light by the optics block 135 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 135 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 135 corrects the distortion when it receives image light from the electronic display generated based on the content.

The position sensor 140 is an electronic device that generates data indicating a position, an orientation, and/or a geographical location of the client device 105. The position sensor 140 generates one or more measurement signals in response to motion of the client device 105. Examples of a position sensor 140 include: one or more inertial measurement units (IMUs), one or more accelerometers, one or more gyroscopes, one or more magnetometers, one or more GPS sensors, another suitable type of sensor that detects motion, or some combination thereof. The position sensor 140 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the client device 105 from the sampled data. For example, the IMU integrates the measurement signals received from the accelerometers over time to estimate a velocity vector and integrates the velocity vector over time to determine an estimated position of a reference point on the client device 105. The reference point is a point that may be used to describe the position of the client device 105. While the reference point may generally be defined as a point in space, in practice, the reference point is defined as a point within the client device 105. In some embodiments, one or more position sensors 140 may generate data describing a geographical location of the client device 105. For example, one or more GPS sensors included in one or more position sensors 140 may generate information describing latitude and longitude coordinates for the client device 105. In various embodiments, one or more position sensors 140 may generate data describing an orientation of a client device 105. For example, one or more position sensors 140 may include one or more magnetometers and one or more accelerometers that generate data indicating a direction that the client device 105 is facing and a tilt of the client device 105 relative to the ground. In some embodiments, one or more position sensors 140 may store information in the data store 155 indicating a position, an orientation, and/or a location of the client device 105 in association with information describing a time at which the information was generated by the position sensor(s) 140.

The DCA 145 generates depth information for a portion of the local area. The local area is the area surrounding the client device 105. For example, the local area may be a room that a user of the client device 105 is inside, or the user of the client device 105 may be outside and the local area is an outside area. The DCA 145 includes one or more imaging devices and a DCA controller. The DCA 145 may also include an illuminator. The one or more imaging devices may capture image data and/or video data depicting a portion of the local area. Image data, video data, and/or depth information for a portion of the local area may be stored in the data store 155 in association with information describing a time at which it was captured. Operation and structure of the DCA 145 is further described below with regard to FIG. 2A.

The audio system 150 provides audio content to a user of the client device 105. The audio system 150 may comprise one or more acoustic sensors, one or more transducers, and an audio controller. The audio system 150 may provide spatialized audio content to the user. In some embodiments, the audio system 150 may request acoustic parameters from the mapping server 125 over the network 120. The acoustic parameters describe one or more acoustic properties (e.g., room impulse response, a reverberation time, a reverberation level, etc.) describing at least a portion of the local area (e.g., from the DCA 145 and/or location information for the client device 105 from the position sensor 140). The audio system 150 may generate one or more sound filters using one or more of the acoustic parameters received from the mapping server 125, and use the sound filters to provide audio content to the user.

The data store 155 stores image data and/or video data captured by the imaging device(s) of the DCA 145. The data may be stored in association with various types of information associated with the data, such as information describing times at which the data were captured, information describing orientations and/or geographical locations of the client device 105 when the data were captured, information identifying physical objects depicted in the data, information describing geographical locations associated with physical objects depicted in the data, depth information for a portion of the local area depicted in the data, or any other suitable types of information. For example, an image or a portion of a video (e.g., one or more frames of the video) may be stored in the data store 155 in association with a timestamp indicating a date and time of day at which it was captured, information identifying one or more physical objects (e.g., a phone, a set of keys, a clothing item, etc.) that is/are depicted, and/or information describing a geographical location associated with each physical object. In this example, the image or the portion of the video also may be stored in association with information describing a direction that the client device 105 was facing and a tilt of the client device 105 relative to the ground when it was captured, GPS coordinates for the client device 105 when it was captured, and/or depth information for a portion of the local area that is depicted.

The user may opt in to allow the data store 155 to record image data and/or video data captured by the imaging device(s) of the DCA 145. In some embodiments, always on recording may be employed, such that the data store 155 records all images and videos captured by the imaging device(s) in order to improve the experience for the user. The user may opt in or opt out to allow or prevent image data and/or video data from being recorded, stored, or transmitted to other entities.

The data store 155 also may store information identifying one or more physical objects. Examples of physical objects include: clothing, accessories, electronics, food, books, vehicles, appliances, furniture, etc. Information identifying a physical object may include an identifier (e.g., a name) associated with the physical object, information describing the physical object (e.g., type, size, dimension(s), color(s), etc.), one or more trackable features associated with the physical object, and/or any other suitable types of information. Examples of trackable features associated with a physical object include: a physical beacon device coupled to the physical object, one or more depictions of the physical object (e.g., in one or more images or videos), one or more sounds (e.g., a sound signature) associated with the physical object, or any other suitable types of features. For example, if a physical object (e.g., a set of keys or a phone) is coupled to a physical beacon device, information identifying the physical object stored in the data store 155 may include a name of the physical object (e.g., "keys" or "phone") and information describing the physical beacon device. In this example, information describing the physical beacon device may include a technology used by the physical beacon device (e.g., Bluetooth, GPS, ultra-wideband (UWB), etc.), a brand name, a model number, a unique serial number or a user account associated with the physical beacon device, etc. In the above example, the information identifying the physical object also or alternatively may include one or more depictions of the physical object (e.g., in one or more images and/or portions of one or more videos) captured by the DCA 145 and information stored in association with the depiction (s).

Information identifying a physical object may be received (e.g., via the DCA 145 or the I/O interface 110) from a user of the client device 105, a third-party system 180, or any other suitable source. For example, when an image or a video depicting a physical object is received by the DCA 145, the client device 105 may send (e.g., via the display assembly 130) a prompt to a user to identify the physical object. In this example, information identifying the physical object received (e.g., via the I/O interface 110) from the user may then be stored in association with the image or the video in the data store 155. As an additional example, information identifying a physical object stored in the data store 155 may be included in a catalog of physical objects or in one or more web pages received from a third-party system 180.

In some embodiments, information identifying a physical object may be received when the physical object is explicitly tagged. A physical object may be explicitly tagged based on one or more trackable features associated with the physical object. In embodiments in which a physical object is explicitly tagged, information identifying the physical object may be received in association with a request from a user to tag the physical object with a physical beacon device. For example, a physical object may be explicitly tagged when a request is received (e.g., via the I/O interface 110) from a user to tag the physical object so that it may be located at a later time using a physical beacon device, in which the request includes information describing the physical beacon device and a name or other identifier associated with the physical object to which the physical beacon device is attached. In this example, the information describing the physical beacon device may then be stored in the data store 155 in association with the name/identifier associated with the physical object, information indicating the physical object has been tagged, and information describing a time at which the physical object was tagged.

In embodiments in which a physical object is explicitly tagged, information identifying the physical object also may be received in association with a request from a user to tag the physical object based on a depiction of the physical object (e.g., in an image or a video) received via the DCA 145. For example, if an image or a video depicting a physical object is presented to a user via the display assembly 130, the physical object may be explicitly tagged when a request is received from the user (e.g., via the I/O interface 110) to tag the physical object so that it may be located at a later time, in which the request identifies the physical object depicted within the image or the video. In this example, the image or a portion of the video (e.g., one or more frames of the video) in which the physical object is depicted may then be stored in the data store 155 in association with information identifying the physical object, information indicating the physical object has been tagged, a time associated with the depiction, and/or any other suitable types of information that may be stored in association with the depiction.

In various embodiments, information identifying a physical object may be received when the physical object is implicitly tagged. Similar to embodiments in which a physical object is explicitly tagged, a physical object may be implicitly tagged based on one or more trackable features associated with the physical object. In embodiments in which a physical object is implicitly tagged, information identifying the physical object may be received absent a request from a user to tag the physical object. In some embodiments, a physical object may be implicitly tagged by the tracking module 170 when it determines that the physical object is depicted in an image or a video, as further described below. For example, if an image or a video depicts a physical object, the tracking module 170 may determine that the physical object is depicted in the image or video and tag the physical object so that it may be located at a later time. In this example, the tracking module 170 may then store the image or a portion of the video (e.g., one or more frames of the video) in which the physical object is depicted in the data store 155 in association with information identifying the physical object, information indicating the physical object has been tagged, a time associated with the depiction, and/or any other suitable types of information that may be stored in association with the depiction.

In embodiments in which the tracking module 170 determines a most recent geographical location associated with a physical object using one or more machine learning models, as described below, the model(s) may be trained by the machine learning training module 160. The machine learning model(s) may be trained to predict a likelihood that a physical object is depicted in an image or a video. In some embodiments, the machine learning model(s) may be trained based on a set of attributes of depictions of physical objects, such as one or more dimensions, edges, angles, surfaces, contours and/or colors in the depictions of the physical objects, text included in the depictions of the physical objects, one or more images included in the depictions of the physical objects, or any other suitable attributes of depictions of physical objects. For example, the machine learning training module 160 may receive a set of attributes of depictions of various physical objects, such that each depiction of a physical object may include one or more dimensions, edges, angles, surfaces, contours, colors, and/or images, text, etc. Continuing with this example, for each depiction, the machine learning training module 160 may receive a label identifying a physical object being depicted (e.g., by prompting the user for this information or by accessing this information from one or more web pages, catalogs of physical objects, etc. stored in the data store 155). In the above example, the machine learning training module 160 may then train the machine learning model(s) based on the set of attributes and the label for each depiction. Once trained, the machine learning model(s) may be stored in the data store 155. A machine learning model may be retrained periodically or as new training data becomes available. For example, a machine learning model may be retrained each time a user provides information identifying a physical object depicted in an image or a video, each time a catalog of physical objects is received or updated, etc. and the retrained model may then be stored in the data store 155.

The application store 165 stores one or more applications for execution by the console 115 or the client device 105. An application is a group of instructions that, when executed by a processor, generates content for presentation to the user. Content generated by an application may be in response to inputs received from the user via movement of the client device 105 or the I/O interface 110. Examples of applications include: gaming applications, conferencing applications, video playback applications, or other suitable applications.

The tracking module 170 tracks movements of the client device 105 or of the I/O interface 110 using information from the DCA 145, the one or more position sensors 140, or some combination thereof. For example, the tracking module 170 determines a position of a reference point of the client device 105 in a mapping of a local area based on information from the client device 105. The tracking module 170 may also determine positions of a physical object or a virtual object. Additionally, in some embodiments, the tracking module 170 may use portions of data indicating a position of the client device 105 from the position sensor 140 as well as representations of the local area from the DCA 145 to predict a future location of the client device 105. The tracking module 170 provides the estimated or predicted future position of the client device 105 or the I/O interface 110 to the engine 175.

The tracking module 170 also may determine whether a physical object is depicted in image or video data as the data are captured by the DCA 145. The tracking module 170 may do so based on information stored in the data store 155 or by using one or more machine learning models. For example, the tracking module 170 may compare live video captured by the DCA 145 to images and/or videos of a physical object stored in the data store 155 and determine whether the physical object is depicted in the live video based on the comparison. Alternatively, in the above example, the tracking module 170 may access one or more machine learning models trained to predict a likelihood that the physical object is depicted in an image or a video and apply the model(s) to a set of attributes of a portion of the live video (e.g., one or more frames of the live video) and determine whether the physical object is depicted in the live video based on an output received from the model(s). If the tracking module 170 determines that a physical object is depicted in video data, it may store information identifying the physical object in association with various types of information in the data store 155. In the above example, if the data store 155 stores video data as the video data are captured by the DCA 145, the video data may be stored in association with information identifying the physical object depicted in the video data, and information describing a time associated with each depiction of the physical object. In the above example, the video data also may be stored in association with information describing an orientation and a geographical location of the client device 105 received from the position sensor(s) 140 and depth information for a portion of the local area generated by the DCA 145 each time the physical object was depicted.

As described above, in some embodiments, the tracking module 170 may determine whether a physical object is depicted in image data or video data using one or more machine learning models, which may be trained by the machine learning training module 160. To use the machine learning model(s), the tracking module 170 may access the machine learning model(s) (e.g., from the data store 155) and apply the model(s) to a set of attributes of a depiction. For example, suppose that a physical object is depicted in an image or a video. In this example, the tracking module 170 may access the machine learning model(s) and apply the model(s) to one or more dimensions, edges, angles, surfaces, contours, colors, and/or images included in the image or a portion of the video (e.g., one or more frames of the video), text included in the image or the portion of the video, etc. The tracking module 170 may then receive an output indicating a predicted likelihood that the physical object is depicted and the tracking module 170 may determine whether the physical object is depicted based on the predicted likelihood. In the above example, if the output indicates there is a 75% likelihood that the physical object is depicted in the image or the portion of the video, the tracking module 170 may determine that the physical object is depicted in the image or the portion of the video if the predicted likelihood is at least a threshold likelihood.

In embodiments in which the tracking module 170 determines a physical object is depicted in image or video data as the data are captured by the DCA 145, the tracking module 170 also may determine a geographical location associated with the physical object. The tracking module 170 may make this determination based on information describing an orientation and a geographical location of the client device 105 when the image or video data were captured and depth information for a portion of the local area depicted in the image or video data. For example, if a physical object is depicted in live video, the tracking module 170 may determine a geographical location associated with the physical object based on information describing a current orientation and a current geographical location of the client device 105 received from the position sensor(s) 140 and current depth information for a portion of the local area generated by the DCA 145. The tracking module 170 may then store information describing the geographical location associated with the physical object in association with the image or video data in which the physical object is depicted. In the above example, the tracking module 170 may store latitude and longitude coordinates associated with the physical object in the data store 155 in association with the live video.

The tracking module 170 also may determine a most recent geographical location associated with a physical object using a physical beacon device associated with the physical object. A physical beacon device may send a wireless signal (e.g., via Bluetooth) that may be used to determine its geographical location. A signal may be sent by a physical beacon device at periodic intervals (e.g., every 15 minutes), based on its proximity to other devices (e.g., whether it is close enough to establish a Bluetooth connection), or in response to receiving a request for its geographical location. Furthermore, a geographical location of a physical beacon device may be determined using any technique or combination of techniques. For example, if a physical object is coupled to a physical beacon device, information describing a geographical location of the physical beacon device may be sent to a cloud service (e.g., by nearby client devices 105 in a crowdsourced network that triangulate its geographical location based on a strength of a secure Bluetooth signal sent by the physical beacon device detected by the client devices 105). In this example, the tracking module 170 may determine a most recent geographical location associated with the physical object by forwarding (e.g., via the network 120) a request to locate the physical object (e.g., received from a user of the client device 105 via the I/O interface 110) to the cloud service for information describing the most recent geographical location of the physical beacon device. In this example, the tracking module 170 may determine the most recent geographical location associated with the physical object based on information included in a response to the request.

The tracking module 170 also may determine a most recent geographical location associated with a physical object based at least in part on a depiction of the physical object most recently captured by the DCA 145. To make this determination, the tracking module 170 may first identify the depiction of the physical object most recently captured by the DCA 145 by determining whether the physical object is depicted in image or video data as the image or video data are captured by the DCA 145, as described above. In various embodiments, the tracking module 170 also may identify the depiction of the physical object most recently captured by the DCA 145 by accessing image and/or video data stored in the data store 155 and determining a most recent time associated with image data or a portion of video data depicting the physical object. In such embodiments, the tracking module 170 may determine whether the physical object is depicted in image and/or video data that was most recently captured (e.g., based on information stored in the data store 155 or by using one or more machine learning models) and, if necessary, repeating the process for image and/or video data captured at progressively earlier times until a depiction of the physical object most recently captured is identified. For example, based on information describing a time of capture stored in association with one or more images and/or videos in the data store 155, the tracking module 170 may access an image or a portion of a video (e.g., one or more frames of the video) associated with a most recent time and determine whether a physical object is depicted in the image or the portion of the video by comparing it to images and/or videos of the physical object stored in the data store 155. Alternatively, in the above example, the tracking module 170 may access one or more machine learning models trained to predict a likelihood that the physical object is depicted in an image or a video and apply the model(s) to a set of attributes of the image or the portion of the video and determine whether the physical object is depicted in the image or the portion of the video based on an output received from the model(s). Continuing with the above example, if the tracking module 170 determines that the physical object is not depicted in the image or the portion of the video, the tracking module 170 may then repeat the process with images or portions of a video associated with progressively earlier times until it is able to identify a depiction of the physical object most recently captured.

Upon identifying a depiction of a physical object most recently captured by the DCA 145, the tracking module 170 may determine a most recent geographical location associated with the physical object. In some embodiments, the tracking module 170 may do so based on information describing an orientation and a geographical location of the client device 105 and depth information for a portion of the local area associated with the depiction. For example, suppose that a depiction of a physical object most recently captured by the DCA 145 is an image or a portion of a video stored in the data store 155 and that the tracking module 170 determines whether the physical object is depicted in image or video data as the image or video data are captured by the DCA 145. In this example, if the tracking module 170 previously determined a geographical location associated with the physical object, the tracking module 170 may retrieve information describing the geographical location stored in association with the image or the portion of the video and determine a most recent geographical location associated with the physical object corresponding to the retrieved geographical location. Alternatively, in the above example, suppose that the tracking module 170 did not previously determine the geographical location associated with the physical object. In this example, the tracking module 170 may retrieve information stored in association with the image or the portion of the video describing the orientation and the geographical location of the client device 105 and depth information for the portion of the local area depicted in the image or the portion of the video and determine the most recent geographical location associated with the physical object based on the retrieved information. As an additional example, if the depiction of the physical object most recently captured is in live video, the tracking module 170 may determine a most recent geographical location associated with the physical object based on information describing a current orientation and a current geographical location of the client device 105 received from the position sensor(s) 140 and current depth information for a portion of the local area generated by the DCA 145.

The engine 175 executes applications and receives position information, acceleration information, velocity information, predicted future positions, or some combination thereof, of the client device 105 from the tracking module 170. Based on the received information, the engine 175 determines content to provide to the client device 105 for presentation to the user. For example, if the received information indicates that the user has looked to the left, the engine 175 generates content for the client device 105 that mirrors the user's movement in a virtual local area or in a local area augmenting the local area with additional content. Additionally, the engine 175 performs an action within an application executing on the console 115 in response to an action request received from the I/O interface 110 and provides feedback to the user that the action was performed. The provided feedback may be visual or audible feedback via the client device 105 or haptic feedback via the I/O interface 110.

In some embodiments, the engine 175 may generate a set of instructions guiding a user of the client device 105 to a most recent geographical location associated with a physical object. The engine 175 may generate the set of instructions based on a current orientation and a current geographical location of the client device 105 and the most recent geographical location associated with the physical object. For example, once tracking module 170 (or tracking module 350, described below) has determined a most recent geographical location associated with a physical object, the engine 175 may receive information describing a current orientation and a current geographical location of the client device 105 from the position sensor(s) 140. In this example, based on the received information and the most recent geographical location associated with the physical object, the engine 175 may generate a set of instructions guiding the user from their current geographical location to a most recent geographical location associated with the physical object. In some embodiments, the engine 175 also may generate the set of instructions based on information describing a local area of the client device 105. In the above example, the engine 175 also may access a current configuration of the local area of the client device 105 (e.g., from the mapping server 125) and generate the set of instructions based on the current configuration of the local area.

A set of instructions generated by the engine 175 may guide a user to a most recent geographical location associated with a physical object with visual signals, audio signals, haptic feedback, and/or using any other suitable means. For example, a set of instructions may include audio and/or visual turn-by-turn instructions. Alternatively, in the above example, the engine 175 may generate a set of spatial audio cues guiding a user from their current geographical location to a most recent geographical location associated with a physical object. In embodiments in which a set of instructions generated by the engine 175 includes a set of spatial audio cues, the set of spatial audio cues may be a spatialized sound beacon that guides a user based on a proximity of the user to a most recent geographical location associated with a physical object by changing in volume, pitch, depth, etc. as the user gets closer to the location. For example, a spatialized sound beacon may guide a user by becoming louder as the user approaches or faces a most recent geographical location associated with a physical object and becoming quieter as the user moves or faces away from it. Similarly, in embodiments in which a set of instructions generated by the engine 175 includes haptic feedback, the haptic feedback may guide a user based on a proximity of the user to a most recent geographical location associated with a physical object. For example, the I/O interface 110 may generate haptic feedback by vibrating more frequently as a user approaches or faces a most recent geographical location associated with a physical object and vibrating less frequently as the user moves or faces away from it.

The I/O interface 110 is a device that allows a user to send action requests and receive responses from the console 115. An action request is a request to perform a particular action. For example, an action request may be an instruction to start or end capture of image or video data, or an instruction to perform a particular action within an application. As an additional example, an action request may be an instruction to tag or locate a physical object. The I/O interface 110 may include one or more input devices. Example input devices include: a keyboard, a mouse, a game controller, or any other suitable device for receiving action requests and communicating the action requests to the console 115. An action request received by the I/O interface 110 is communicated to the client device 105 or the console 115, which performs an action corresponding to the action request. For example, if an action request corresponds to an instruction to tag a physical object so that it may be located at a later time, the I/O interface 110 may send the action request to the client device 105 or the console 115, which may store one or more trackable features associated with the physical object and information indicating that the physical object has been tagged. As an additional example, if an action request corresponds to an instruction to locate a physical object, the I/O interface 110 may send the action request to the client device 105 or the console 115, which subsequently may communicate instructions to the user that guide the user to the most recent geographical location associated with the physical object. In some embodiments, the I/O interface 110 includes an IMU that captures calibration data indicating an estimated position of the I/O interface 110 relative to an initial position of the I/O interface 110. In some embodiments, the I/O interface 110 may provide haptic feedback to the user in accordance with instructions received from the console 115. For example, haptic feedback is provided when an action request is received, or the console 115 communicates instructions to the I/O interface 110 causing the I/O interface 110 to generate haptic feedback when the console 115 performs an action.

The console 115 provides content to the client device 105 for processing in accordance with information received from one or more of: the DCA 145, the client device 105, and the I/O interface 110. In the example shown in FIG. 1, the console 115 includes the data store 155, the machine learning training module 160, the application store 165, the tracking module 170, and the engine 175, which are described above. Some embodiments of the console 115 have different modules or components than those described in conjunction with FIG. 1. Similarly, the functions further described below may be distributed among components of the console 115 in a different manner than described in conjunction with FIG. 1. In some embodiments, the functionality discussed herein with respect to the console 115 may be implemented in the client device 105 or a remote system.

The network 120 couples the artificial reality system 102 to the mapping server 125 and the third-party system 180. The network 120 may include any combination of local area and/or wide area networks using both wireless and/or wired communication systems. For example, the network 120 may include the Internet, as well as mobile telephone networks. In one embodiment, the network 120 uses standard communications technologies and/or protocols. Hence, the network 120 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 120 may include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 120 may be represented using technologies and/or formats including image data in binary form (e.g. Portable Network Graphics (PNG)), hypertext markup language (HTML), extensible markup language (XML), etc. In addition, all or some of the links may be encrypted using conventional encryption technologies such as secure sockets layer (SSL), transport layer security (TLS), virtual private networks (VPNs), Internet Protocol security (IPsec), etc.

The mapping server 125 may include a database that stores a virtual model describing a plurality of spaces, wherein one location in the virtual model corresponds to a current configuration of a local area of the artificial reality system 102. The mapping server 125 receives, from the artificial reality system 102 via the network 120, information describing at least a portion of the local area and/or location information for the local area. The user may adjust privacy settings to allow or prevent the artificial reality system 102 from transmitting information to the mapping server 125. The mapping server 125 determines, based on the received information and/or location information, a location in the virtual model that is associated with the local area of the artificial reality system 102. The mapping server 125 determines (e.g., retrieves) one or more acoustic parameters associated with the local area, based in part on the determined location in the virtual model and any acoustic parameters associated with the determined location. The mapping server 125 may transmit the location of the local area and any values of acoustic parameters associated with the local area to the artificial reality system 102.

One or more third-party systems 180 may be coupled to the network 120 for communicating with the artificial reality system 102. In one embodiment, a third-party system 180 provides content or other information describing physical objects that may be stored in and/or accessed by the artificial reality system 102. For example, a third-party system 180 stores one or more web pages including images, videos, and descriptions of physical objects (e.g., clothing, accessories, electronics, food, books, vehicles, etc.), and transmits the web pages to the artificial reality system 102 for storage in data store 155 (and/or data store 335, described below) and/or access by tracking module 170 (and/or tracking module 350, described below). A third-party system 180 may also communicate information to the artificial reality system 102 that describe physical objects, such as catalogs, advertisements, articles, or other information about a physical object provided by the third-party system 180.

One or more components of the system 100 may contain a privacy module that stores one or more privacy settings for user data elements. The user data elements describe the user or the artificial reality system 102. For example, the user data elements may describe a physical characteristic of the user, an action performed by the user, a location of the user of the artificial reality system 102, a location of the artificial reality system 102, a head-related transfer function (HRTF) for the user (described below), etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) may be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements may be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of an artificial reality system 102 within the same local area as the user. If the user subsequently changes location, the entity with access to the user data element may lose access, while a new group of entities may gain access as they come within the threshold distance of the user.

The system 100 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Figure 2A:
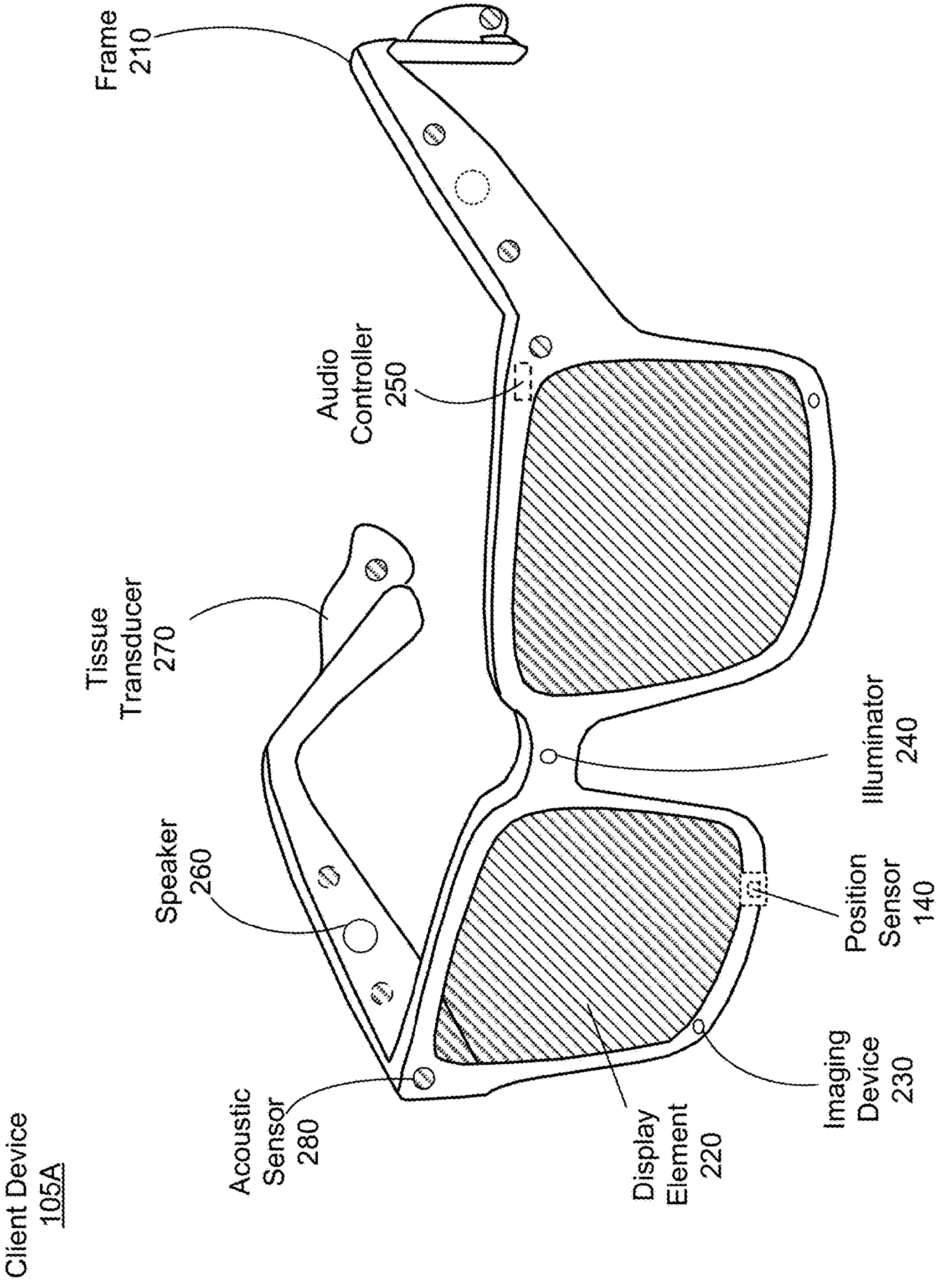
FIG. 2A is a perspective view of a client device implemented as an eyewear device, in accordance with one or more embodiments.

FIG. 2A is a perspective view of a client device 105A implemented as an eyewear device, in accordance with one or more embodiments. In some embodiments, the eyewear device is a near eye display (NED). In general, the client device 105A may be worn on the face of a user such that content (e.g., media content) is presented using the display assembly 130 and/or the audio system 150. However, the client device 105A may also be used such that media content is presented to a user in a different manner. Examples of media content presented by the client device 105A include one or more images, video, audio, or some combination thereof. The client device 105A includes a frame 210, and may include, among other components, the display assembly 130 including one or more display elements 220, the DCA 145, the audio system 150, and the position sensor 140. While FIG. 2A illustrates the components of the client device 105A in example locations on the client device 105A, the components may be located elsewhere on the client device 105A, on a peripheral device paired with the client device 105A, or some combination thereof. Similarly, there may be more or fewer components on the client device 105A than what is shown in FIG. 2A.

The frame 210 holds the other components of the client device 105A. The frame 210 includes a front portion that holds the one or more display elements 220 and end pieces (e.g., temples) that attach to a head of the user. The front portion of the frame 210 bridges the top of a nose of the user. The length of the end pieces may be adjustable (e.g., adjustable temple length) to fit different users. The end pieces may also include a portion that curls behind the ear of the user (e.g., a temple tip, an ear piece, etc.).

The one or more display elements 220 provide light to a user wearing the client device 105A. As illustrated, the client device 105A includes a display element 220 for each eye of a user. In some embodiments, a display element 220 generates image light that is provided to an eyebox of the client device 105A. For example, a display element 220 may be a waveguide display. A waveguide display includes a light source (e.g., a two-dimensional source, one or more line sources, one or more point sources, etc.) and one or more waveguides. Light from the light source is in-coupled into the one or more waveguides, which outputs the light in a manner such that there is pupil replication in an eyebox of the client device 105A. In-coupling and/or out-coupling of light from the one or more waveguides may be done using one or more diffraction gratings. In some embodiments, the waveguide display includes a scanning element (e.g., a waveguide, a mirror, etc.) that scans light from the light source as it is in-coupled into the one or more waveguides. Note that in some embodiments, one or both of the display elements 220 are opaque and do not transmit light from a local area around the client device 105A. In this context, the client device 105A generates VR content. Alternatively, in some embodiments, one or both of the display elements 220 are at least partially transparent, such that light from the local area may be combined with light from the one or more display elements 220 to produce AR and/or MR content.

In some embodiments, a display element 220 does not generate image light, and instead is a lens that transmits light from the local area to the eyebox. For example, one or both of the display elements 220 may be a lens without correction (non-prescription) or a prescription lens (e.g., single vision, bifocal, trifocal, or progressive) to help correct for defects in a user's eyesight. In some embodiments, the display element 220 may be polarized and/or tinted to protect the user's eyes from the sun.

In some embodiments, the display element 220 may include an additional optics block 135 (not shown). The optics block 135 may include one or more optical elements (e.g., lens, Fresnel lens, etc.) that direct light from the display element 220 to the eyebox. For example, the optics block 135 may correct for aberrations in some or all of the image content, magnify some or all of the image, or some combination thereof.

The DCA 145 determines depth information for a portion of a local area surrounding the client device 105A. The DCA 145 includes one or more imaging devices 230 and a DCA controller (not shown in FIG. 2A), and may also include an illuminator 240. In some embodiments, the illuminator 240 illuminates a portion of the local area with light. For example, the light may be structured light (e.g., a dot pattern, bars, etc.) in the infrared (IR), IR flash for time-of-flight, etc. In some embodiments, the one or more imaging devices 230 capture images of the portion of the local area that include the light from the illuminator 240. As illustrated, FIG. 2A shows a single illuminator 240 and two imaging devices 230. In alternate embodiments, there is no illuminator 240 and at least two imaging devices 230.

The DCA controller computes depth information for the portion of the local area using the captured images and one or more depth determination techniques. For example, the depth determination technique may be direct time-of-flight (ToF) depth sensing, indirect ToF depth sensing, structured light, passive stereo analysis, active stereo analysis (uses texture added to the scene by light from the illuminator 240), some other technique to determine depth of a scene, or some combination thereof.

The DCA 145 may include an eye tracking unit that determines eye tracking information. The eye tracking information may comprise information about a position and an orientation of one or both eyes (within their respective eyeboxes). The eye tracking unit may include one or more cameras. The eye tracking unit estimates an angular orientation of one or both eyes based on images captured of one or both eyes by the one or more cameras. In some embodiments, the eye tracking unit may also include one or more illuminators 240 that illuminate one or both eyes with an illumination pattern (e.g., structured light, glints, etc.). The eye tracking unit may use the illumination pattern in the captured images to determine the eye tracking information. The client device 105A may prompt the user to opt in to allow operation of the eye tracking unit. For example, by opting in, the client device 105A may detect and/or store images of the user's eye(s) or any eye tracking information of the user.

The audio system 150 provides audio content. The audio system 150 includes a transducer array, a sensor array, and an audio controller 250. However, in other embodiments, the audio system 150 may include different and/or additional components. Similarly, in some cases, functionality described with reference to the components of the audio system 150 may be distributed among the components in a different manner than is described here. For example, some or all of the functions of the audio controller 250 may be performed by a remote server.

The transducer array presents sound to a user. The transducer array includes a plurality of transducers. A transducer may be a speaker 260 or a tissue transducer 270 (e.g., a bone conduction transducer or a cartilage conduction transducer). Although the speakers 260 are shown exterior to the frame 210, the speakers 260 may be enclosed in the frame 210. In some embodiments, instead of individual speakers 260 for each ear, the client device 105A includes a speaker array comprising multiple speakers 260 integrated into the frame 210 to improve directionality of presented audio content. The tissue transducer 270 couples to the head of the user and directly vibrates tissue (e.g., bone or cartilage) of the user to generate sound. The number and/or locations of transducers may be different from what is shown in FIG. 2A.

The sensor array detects sounds within the local area of the client device 105A. The sensor array includes a plurality of acoustic sensors 280. An acoustic sensor 280 captures sounds emitted from one or more sound sources in the local area (e.g., a room). Each acoustic sensor 280 is configured to detect sound and convert the detected sound into an electronic format (analog or digital). The acoustic sensors 280 may be acoustic wave sensors, microphones, sound transducers, or similar sensors that are suitable for detecting sounds.

In some embodiments, one or more acoustic sensors 280 may be placed in an ear canal of each ear (e.g., acting as binaural microphones). In some embodiments, the acoustic sensors 280 may be placed on an exterior surface of the client device 105A, placed on an interior surface of the client device 105A, separate from the client device 105A (e.g., part of some other device), or some combination thereof. The number and/or locations of acoustic sensors 280 may be different from what is shown in FIG. 2A. For example, the number of acoustic detection locations may be increased to increase the amount of audio information collected and the sensitivity and/or accuracy of the information. The acoustic detection locations may be oriented such that the acoustic sensors 280 are able to detect sounds in a wide range of directions surrounding the user wearing the client device 105A.

The audio controller 250 processes information from the sensor array that describes sounds detected by the sensor array. The audio controller 250 may comprise a processor and a computer-readable storage medium. The audio controller 250 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 260, or some combination thereof.

The position sensor 140 generates one or more measurement signals in response to motion of the client device 105A. The position sensor 140 may be located on a portion of the frame 210 of the client device 105A. The position sensor 140 may include an IMU. Examples of position sensor 140 include: one or more accelerometers, one or more gyroscopes, one or more magnetometers, another suitable type of sensor that detects motion, a type of sensor used for error correction of the IMU, or some combination thereof. The position sensor 140 may be located external to the IMU, internal to the IMU, or some combination thereof.

In some embodiments, the client device 105A may provide for simultaneous localization and mapping (SLAM) for a position of the client device 105A and updating of a model of the local area. For example, the client device 105A may include a passive camera assembly (PCA) that generates color image data. The PCA may include one or more RGB cameras that capture images of some or all of the local area. In some embodiments, some or all of the imaging devices 230 of the DCA 145 may also function as the PCA. The images captured by the PCA and the depth information determined by the DCA 145 may be used to determine parameters of the local area, generate a model of the local area, update a model of the local area, or some combination thereof. Furthermore, the position sensor 140 tracks the position (e.g., location and pose) of the client device 105A within the room.

Figure 2B:
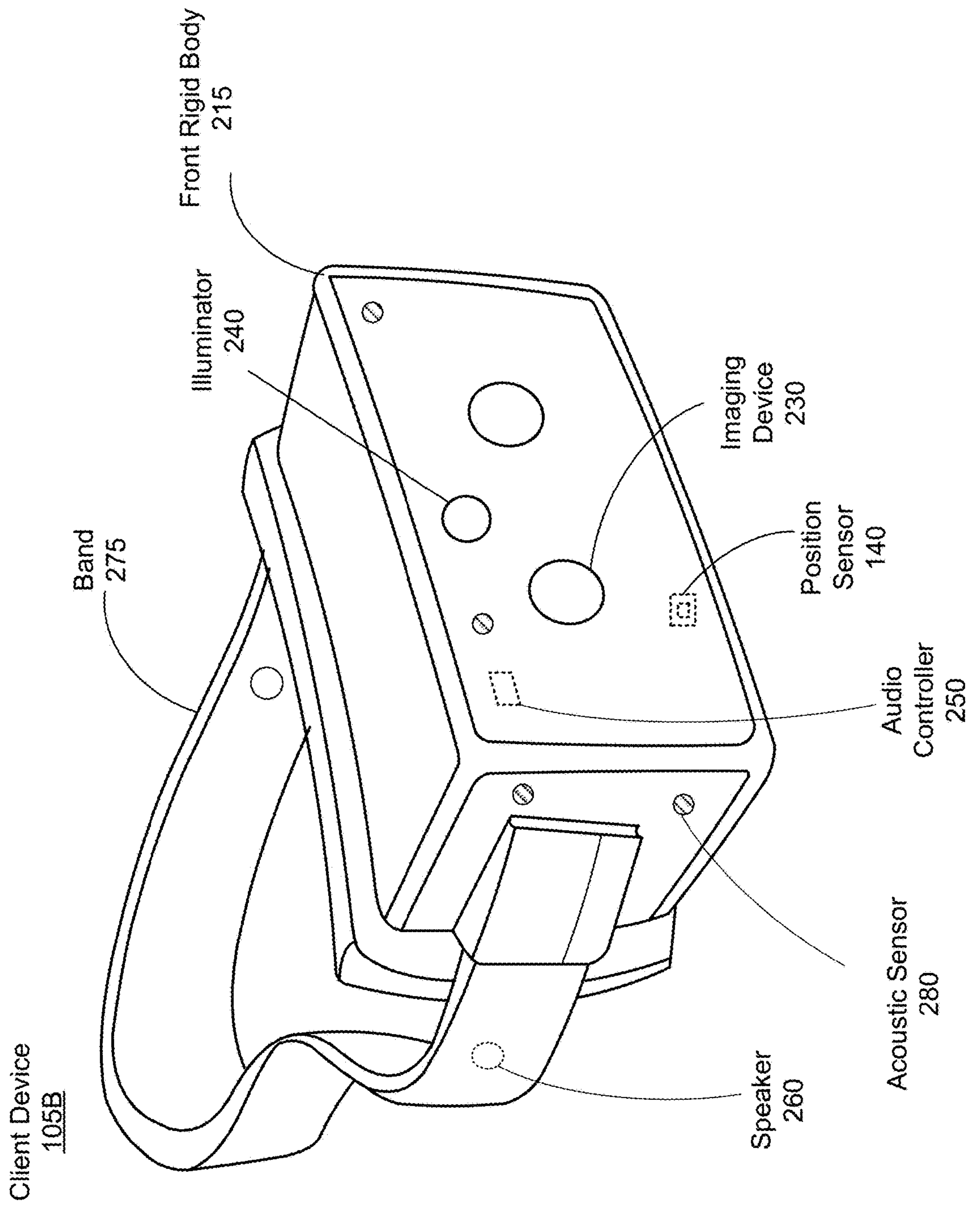
FIG. 2B is a perspective view of a client device implemented as a head-mounted display, in accordance with one or more embodiments.

FIG. 2B is a perspective view of a client device 105B implemented as a head-mounted display (HMD), in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 215 and a band 275. The client device 105B includes many of the same components described above with reference to FIG. 2A, but modified to integrate with the HMD form factor. For example, the HMD includes the display assembly 130, the DCA 145, the audio system 150, and the position sensor 140. FIG. 2B shows the illuminator 240, a plurality of the speakers 260, a plurality of the imaging devices 230, a plurality of acoustic sensors 280, and the position sensor 140. The speakers 260 may be located in various locations, such as coupled to the band 275 (as shown), coupled to front rigid body 215, or may be configured to be inserted within the ear canal of a user.

Figure 3:
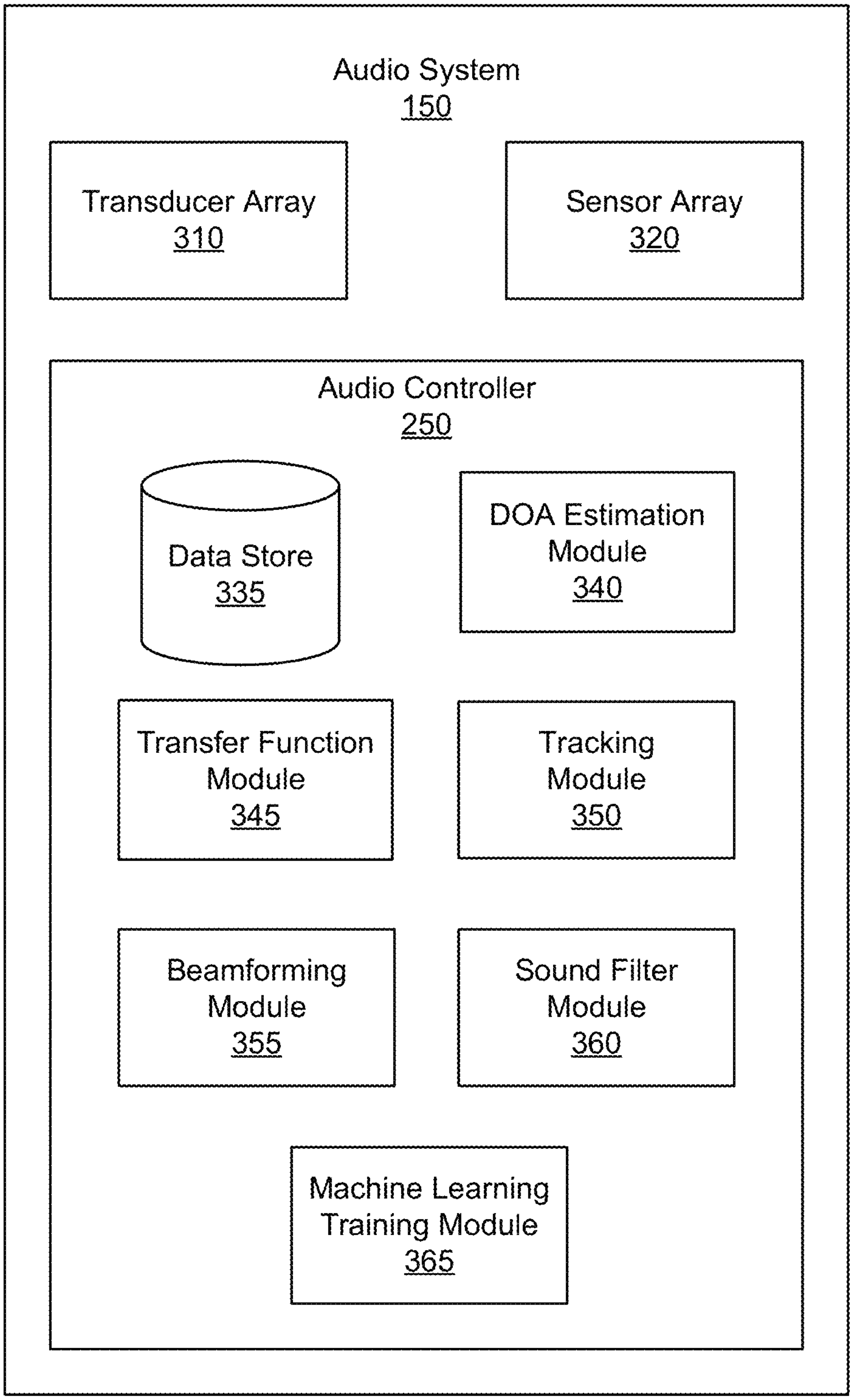
FIG. 3 is a block diagram of an audio system, in accordance with one or more embodiments.

FIG. 3 is a block diagram of an audio system 150, in accordance with one or more embodiments. The audio system 150 in FIG. 2A or FIG. 2B may be an embodiment of the audio system 150 shown in FIG. 3. The audio system 150 generates one or more acoustic transfer functions for a user. The audio system 150 may then use the acoustic transfer function(s) to generate audio content for the user. In the embodiment of FIG. 3, the audio system 150 includes a transducer array 310, a sensor array 320, and the audio controller 250. Some embodiments of the audio system 150 include different components than those described here. Similarly, in some embodiments, functions may be distributed among the components in a different manner than is described here.

The transducer array 310 is configured to communicate audio content to a user. The transducer array 310 includes a plurality of transducers. A transducer is a device that provides audio content. For example, a transducer may be a speaker 260, a tissue transducer 270, some other device that provides audio content, or some combination thereof. A tissue transducer 270 may be configured to function as a bone conduction transducer or a cartilage conduction transducer. The transducer array 310 may communicate audio content via air conduction (e.g., via one or more speakers 260), via bone conduction (via one or more bone conduction transducers), via a cartilage conduction audio system (via one or more cartilage conduction transducers), or some combination thereof. In some embodiments, the transducer array 310 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a client device 105, and may be configured to be behind the auricle coupled to a portion of the user's skull. The bone conduction transducer receives vibration instructions from the audio controller 250, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a client device 105, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate airborne acoustic pressure waves outside the ear canal, tissue-borne acoustic pressure waves that cause some portions of the ear canal to vibrate and thereby generate an airborne acoustic pressure wave within the ear canal, or some combination thereof. The generated airborne acoustic pressure waves propagate down the ear canal toward the ear drum.

The transducer array 310 generates audio content in accordance with instructions from the audio controller 250. In some embodiments, the audio content is spatialized. Spatialized audio content is audio content that appears to originate from a particular direction and/or a target region (e.g., an object in the local area and/or a virtual object). For example, spatialized audio content may make it appear as though sound is originating from a virtual singer across a room from the user. The transducer array 310 may be coupled to a wearable device (e.g., a headset). In alternative embodiments, the transducer array 310 may be a plurality of speakers 260 that are separate from the wearable device (e.g., coupled to an external console 115).

The sensor array 320 detects sounds within a local area surrounding the sensor array 320. The sensor array 320 may include a plurality of acoustic sensors 280 that each detect air pressure variations of a sound wave and convert the detected sounds into an electronic format (analog or digital). The plurality of acoustic sensors 280 may be positioned on a client device 105, (e.g., a headset) on a user (e.g., in an ear canal of the user), on a neckband, or some combination thereof. For example, an acoustic sensor 280 may be a microphone, a vibration sensor, an accelerometer, or any combination thereof. In some embodiments, the sensor array 320 is configured to monitor the audio content generated by the transducer array 310 using at least some of the plurality of acoustic sensors 280. Increasing the number of sensors may improve the accuracy of information (e.g., directionality) describing a sound field produced by the transducer array 310 and/or sound from the local area.

The audio controller 250 controls operation of the audio system 150. In the embodiment of FIG. 3, the audio controller 250 includes a data store 335, a DOA estimation module 340, a transfer function module 345, a tracking module 350, a beamforming module 355, a sound filter module 360, and a machine learning training module 365. The audio controller 250 may be located inside a client device 105 (e.g., a headset), in some embodiments. In some embodiments, the audio controller 250 may have different components than those described here. Similarly, functions may be distributed among the components in a different manner than described here. For example, some functions of the audio controller 250 may be performed external to a client device 105. The user may opt in to allow the audio controller 250 to transmit data captured by a client device 105 to systems external to the client device 105, and the user may select privacy settings controlling access to any such data.

The data store 335 stores data for use by the audio system 150. Data in the data store 335 may include sounds recorded in the local area of the audio system 150, audio content, head-related transfer functions (HRTFs), transfer functions for one or more sensors, array transfer functions (ATFs) for one or more of the acoustic sensors 280, sound source locations, a virtual model of the local area, direction of arrival estimates, sound filters, and any other suitable data that may be used by the audio system 150, or any combination thereof.

Audio data captured by the audio system 150 may be stored in the data store 335 in association with various types of information associated with the data. Examples of such types of information include: information describing times at which the data were captured, information describing orientations and/or geographical locations of the client device 105 when the data were captured, information identifying physical objects associated with the data, information describing geographical locations associated with physical objects associated with the data, information describing sources of sounds within the local area when the data were captured, or any other suitable types of information. For example, a sound may be stored in the data store 335 in association with a timestamp indicating a date and time of day at which it was captured, information identifying one or more physical objects (e.g., a phone, a set of keys, etc.) associated with the sound, and/or information describing a geographical location associated with each physical object.

In this example, the sound also may be stored in association with information describing a direction that the client device 105 was facing and a tilt of the client device 105 relative to the ground when it was captured, GPS coordinates for the client device 105 when it was captured, and/or information describing a source of the sound within the local area.

The user may opt in to allow the data store 335 to record audio data captured by the audio system 150. In some embodiments, the audio system 150 may employ always on recording, such that the data store 335 records all sounds captured by the audio system 150 in order to improve the experience for the user. The user may opt in or opt out to allow or prevent audio data from being recorded, stored, or transmitted to other entities.

Similar to data store 155, data store 335 also may store information identifying one or more physical objects. As described above, examples of physical objects include: clothing, accessories, electronics, food, books, vehicles, appliances, furniture, etc. Information identifying a physical object may include an identifier (e.g., a name) associated with the physical object, information describing the physical object (e.g., type, size, dimension(s), color(s), etc.), one or more trackable features associated with the physical object, and/or any other suitable types of information. As also described above, examples of trackable features associated with a physical object include: a physical beacon device coupled to the physical object, one or more depictions of the physical object (e.g., in one or more images or videos), one or more sounds (e.g., a sound signature) associated with the physical object, or any other suitable types of features. For example, information identifying a physical object (e.g., a set of keys or a phone) stored in the data store 335 may include a name of the physical object (e.g., "keys" or "phone"), one or more sounds associated with the physical object (e.g., a sound signature corresponding to a jangling sound associated with a set of keys or a ringtone associated with a phone) captured by the audio system 150, and information stored in association with the sound(s).

Information identifying a physical object may be received (e.g., via the audio system 150 or the I/O interface 110), from a user of the client device 105, a third-party system 180, or any other suitable source. For example, when a sound associated with a physical object is received by the audio system 150, the client device 105 may send (e.g., via the display assembly 130) a prompt to a user to identify the physical object. In this example, information identifying the physical object received (e.g., via the I/O interface 110) from the user may then be stored in association with the sound in the data store 335. As an additional example, information identifying a physical object stored in the data store 335 may be included in a catalog of sounds or in a video or an audio clip included in one or more web pages received from a third-party system 180.

As described above, in some embodiments, information identifying a physical object may be received when the physical object is explicitly tagged. A physical object may be explicitly tagged based on one or more trackable features associated with the physical object. In embodiments in which a physical object is explicitly tagged, information identifying the physical object may be received in association with a request from a user to tag the physical object based on a sound (e.g., a sound signature) associated with the physical object received via the audio system 150. For example, if a sound associated with a physical object is presented to a user via the audio system 150, the physical object may be explicitly tagged when a request is received from the user (e.g., via the I/O interface 110) to tag the physical object so that it may be located at a later time, in which the request identifies the physical object associated with the sound. In this example, the sound associated with the physical object may then be stored in the data store 335 in association with information identifying the physical object, information indicating the physical object has been tagged, a time associated with the sound, and/or any other suitable types of information that may be stored in association with the sound.

In various embodiments, information identifying a physical object may be received when the physical object is implicitly tagged. Similar to embodiments in which a physical object is explicitly tagged, a physical object may be implicitly tagged based on one or more trackable features associated with the physical object. In embodiments in which a physical object is implicitly tagged, information identifying the physical object may be received absent a request from a user to tag the physical object. In some embodiments, a physical object may be implicitly tagged by the tracking module 350 when it determines that the physical object is associated with a sound, as further described below. For example, if a sound is associated with a physical object, the tracking module 350 may determine that the physical object is associated with the sound and tag the physical object so that it may be located at a later time. In this example, the tracking module 350 may then store the sound with which the physical object is associated in the data store 335 in association with information identifying the physical object, information indicating the physical object has been tagged, a time associated with the sound, and/or any other suitable types of information that may be stored in association with the sound.

The DOA estimation module 340 is configured to localize sound sources in the local area based in part on information from the sensor array 320. Localization is a process of determining where sound sources are located relative to the user. The DOA estimation module 340 performs a DOA analysis to localize one or more sound sources within the local area. The DOA analysis may include analyzing the intensity, spectra, and/or arrival time of each sound at the sensor array 320 to determine the direction from which the sounds originated. In some embodiments, the DOA analysis may include any suitable algorithm for analyzing a surrounding acoustic environment in which the audio system 150 is located. For example, the DOA analysis may be designed to receive input signals from the sensor array 320 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squares (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 320 received the direct-path audio signal. The determined angle may then be used to identify the DOA for the received input signal. Other algorithms not listed above may also be used alone or in combination with the above algorithms to determine the DOA.

In some embodiments, the DOA estimation module 340 may also determine the DOA with respect to an absolute position of the audio system 150 within the local area. The position of the sensor array 320 may be received from an external system, such as some other component of a client device 105, a console 115 (e.g., an artificial reality console 115), a mapping server 125, a position sensor 140, etc. The external system may create a virtual model of the local area, in which the local area and the position of the audio system 150 are mapped. The received position information may include a location and/or an orientation of some or all of the audio system 150 (e.g., of the sensor array 320). The DOA estimation module 340 may update the estimated DOA based on the received position information.

The transfer function module 345 is configured to generate one or more acoustic transfer functions. Generally, a transfer function is a mathematical function giving a corresponding output value for each possible input value. Based on parameters of the detected sounds, the transfer function module 345 generates one or more acoustic transfer functions associated with the audio system 150. The acoustic transfer functions may be ATFs, HRTFs, other types of acoustic transfer functions, or some combination thereof. An ATF characterizes how a microphone or other acoustic sensor 280 receives a sound from a point in space.

An ATF includes a number of transfer functions that characterize a relationship between a sound source and a corresponding sound received by the acoustic sensors 280 in the sensor array 320. Accordingly, for a sound source, there is a corresponding transfer function for each of the acoustic sensors 280 in the sensor array 320. Note that the sound source may be, for example, someone or something generating sound in the local area, the user, or one or more transducers of the transducer array 310. The ATF for a particular sound source location relative to the sensor array 320 may differ from user to user due to a user's anatomy (e.g., ear shape, shoulders, etc.) that affects the sound as it travels to the user's ears. Accordingly, the ATFs of the sensor array 320 are personalized for each user.

In some embodiments, the transfer function module 345 determines one or more HRTFs for a user. The HRTF characterizes how an ear receives a sound from a point in space. The HRTF for a particular source location relative to a user is unique to each ear of the user (and is unique to the user) due to the user's anatomy (e.g., ear shape, shoulders, etc.) that affects the sound as it travels to the user's ears. In some embodiments, the transfer function module 345 may determine HRTFs for the user using a calibration process. In various embodiments, the transfer function module 345 may provide information about the user to a remote system. In such embodiments, the remote system may determine a set of HRTFs that are customized to the user (e.g., using machine learning) and provide the customized set of HRTFs to the audio system 150. In some embodiments, the user may adjust privacy settings to allow or prevent the transfer function module 345 from providing the information about the user to any remote systems.

The tracking module 350 is configured to track locations of one or more sound sources. The tracking module 350 may do so by comparing current DOA estimates with each other and with a stored history of previous DOA estimates. In some embodiments, the tracking module 350 may recalculate DOA estimates on a periodic schedule, such as once per second, or once per millisecond. The tracking module 350 may compare the current DOA estimates with previous DOA estimates, and in response to a change in a DOA estimate for a sound source, the tracking module 350 may determine that the sound source moved. In some embodiments, the tracking module 350 may detect a change in location based on visual information received from a client device 105 or some other external source. The tracking module 350 may track the movement of one or more sound sources over time. The tracking module 350 may store values for a number of sound sources and a location of each sound source at each point in time. In response to a change in a value of the number or locations of the sound sources, the tracking module 350 may determine that a sound source moved. The tracking module 350 may calculate an estimate of the localization variance. The localization variance may be used as a confidence level for each determination of a change in movement.

The tracking module 350 also may determine whether a sound included in audio data is associated with a physical object as the data are captured by the audio system 150. The tracking module 350 may do so based on information stored in the data store 335 or by using one or more machine learning models. For example, the tracking module 350 may compare live audio captured by the audio system 150 to sounds associated with a physical object stored in the data store 335 and determine whether the physical object is associated with a sound included in the live audio based on the comparison. Alternatively, in the above example, the tracking module 350 may access one or more machine learning models trained to predict a likelihood that the physical object is associated with a sound and apply the model(s) to a set of attributes of the sound included in the live audio and determine whether the physical object is associated with the sound based on an output received from the model(s). If the tracking module 350 determines that a physical object is associated with a sound included in audio data, it may store information identifying the physical object in association with various types of information in the data store 335. In the above example, if the data store 335 stores audio data as the audio data are captured by the audio system 150, the audio data may be stored in association with information identifying the physical object associated with the sound included in the audio data and information describing a time that each sound associated with the physical object was captured. In the above example, the audio data also may be stored in association with information describing an orientation and a geographical location of the client device 105 received from the position sensor(s) 140 and information describing a source of the sound associated with the physical object within the local area determined by the DOA estimation module 340 each time the sound was captured.

As described above, in some embodiments, the tracking module 350 may determine whether a physical object is associated with a sound included in audio data using one or more machine learning models, which may be trained by the machine learning training module 365 as further described below. To use the machine learning model(s), the tracking module 350 may access the machine learning model(s) (e.g., from the data store 335) and apply the model(s) to a set of attributes of a sound. For example, suppose that a physical object is associated with a sound. In this example, the tracking module 350 may access the machine learning model(s) and apply the model(s) to one or more amplitudes, frequencies, wavelengths, and/or volumes of the sound, information indicating whether the sound is continuous or intermittent, etc. The tracking module 350 may then receive an output indicating a predicted likelihood that the physical object is associated with the sound, and the tracking module 350 may determine whether the physical object is associated with the sound based on the predicted likelihood. In the above example, if the output indicates there is an 85% likelihood that the physical object is associated with the sound, the tracking module 350 may determine that the physical object is associated with the sound if the predicted likelihood is at least a threshold likelihood.

In embodiments in which the tracking module 350 determines a sound included in audio data is associated with a physical object as the data are captured by the audio system 150, the tracking module 350 also may determine a geographical location associated with the physical object. The tracking module 350 may make this determination based on information describing an orientation and a geographical location of the client device 105 and information describing a source of the sound within the local area when the audio data were captured. For example, if a physical object is associated with a sound included in live audio, the tracking module 350 may determine a geographical location associated with the physical object based on information describing a current orientation and a current geographical location of the client device 105 received from the position sensor(s) 140 and information describing a current source of the sound within the local area determined by the DOA estimation module 340. The tracking module 350 may then store information describing the geographical location associated with the physical object in association with the audio data in which the sound associated with the physical object is included. In the above example, the tracking module 350 may store latitude and longitude coordinates associated with the physical object in the data store 335 in association with the live audio.

The tracking module 350 also may determine a most recent geographical location associated with a physical object based at least in part on a sound associated with the physical object most recently captured by the audio system 150. To make this determination, the tracking module 350 may first identify the sound associated with the physical object most recently captured by the audio system 150 by determining whether the physical object is associated with a sound included in audio data as the audio data are captured by the audio system 150, as described above. In various embodiments, the tracking module 350 also may identify the sound associated with the physical object most recently captured by the audio system 150 by accessing audio data stored in the data store 335 and determining a most recent time associated with a sound associated with the physical object. In such embodiments, the tracking module 350 may determine whether the physical object is associated with a sound that was most recently captured (e.g., based on information stored in the data store 335 or by using one or more machine learning models) and, if necessary, repeating the process for sounds captured at progressively earlier times until a sound associated with the physical object most recently captured is identified. For example, based on information describing a time of capture stored in association with one or more sounds in the data store 335, the tracking module 350 may access a sound associated with a most recent time and determine whether a physical object is associated with the sound by comparing it to sounds associated with the physical object stored in the data store 335. Alternatively, in the above example, the tracking module 350 may access one or more machine learning models trained to predict a likelihood that the physical object is associated with a sound and apply the model(s) to a set of attributes of the sound and determine whether the physical object is associated with the sound based on an output received from the model(s). Continuing with the above example, if the tracking module 350 determines that the physical object is not associated with the sound, the tracking module 350 may then repeat the process with sounds associated with progressively earlier times until it is able to identify a sound associated with the physical object most recently captured.

Upon identifying a sound associated with a physical object most recently captured by the audio system 150, the tracking module 350 may determine a most recent geographical location associated with the physical object. In some embodiments, the tracking module 350 may do so based on information describing an orientation and a geographical location of the client device 105 and information describing a source of the sound within the local area. For example, suppose that a sound associated with a physical object most recently captured by the audio system 150 is a sound stored in the data store 335 and that the tracking module 350 determines whether the physical object is associated with a sound included in audio data as the audio data are captured by the audio system 150. In this example, if the tracking module 350 previously determined a geographical location associated with the physical object, the tracking module 350 may retrieve information describing the geographical location stored in association with the sound and determine a most recent geographical location associated with the physical object corresponding to the retrieved geographical location. Alternatively, in the above example, suppose that the tracking module 350 did not previously determine the geographical location associated with the physical object. In this example, the tracking module 350 may retrieve information stored in association with the sound describing the orientation and the geographical location of the client device 105 and information describing a source of the sound within the local area when the sound was captured and determine the most recent geographical location associated with the physical object based on the retrieved information. As an additional example, if the sound associated with the physical object most recently captured is in live audio, the tracking module 350 may determine a most recent geographical location associated with the physical object based on information describing a current orientation and a current geographical location of the client device 105 received from the position sensor(s) 140 and information describing a current source of the sound within the local area determined by the DOA estimation module 340.

The beamforming module 355 is configured to process one or more ATFs to selectively emphasize sounds from sound sources within a certain area while de-emphasizing sounds from other areas. In analyzing sounds detected by the sensor array 320, the beamforming module 355 may combine information from different acoustic sensors 280 to emphasize sound associated from a particular region of the local area while de-emphasizing sound that is from outside of the region. The beamforming module 355 may isolate an audio signal associated with sound from a particular sound source from other sound sources in the local area (e.g., based on different DOA estimates from the DOA estimation module 340 and the tracking module 350). The beamforming module 355 may thus selectively analyze discrete sound sources in the local area. In some embodiments, the beamforming module 355 may enhance a signal from a sound source. For example, the beamforming module 355 may apply sound filters which eliminate signals above, below, or between certain frequencies. Signal enhancement acts to enhance sounds associated with a given identified sound source relative to other sounds detected by the sensor array 320.

The sound filter module 360 determines sound filters for the transducer array 310. In some embodiments, the sound filters cause the audio content to be spatialized, such that the audio content appears to originate from a target region. The sound filter module 360 may use HRTFs and/or acoustic parameters to generate the sound filters. The acoustic parameters describe acoustic properties of the local area. For example, the acoustic parameters may include a reverberation time, a reverberation level, a room impulse response, etc. In some embodiments, the sound filter module 360 calculates one or more of the acoustic parameters. In various embodiments, the sound filter module 360 requests the acoustic parameters from a mapping server 125. The sound filter module 360 provides the sound filters to the transducer array 310. In some embodiments, the sound filters may cause positive or negative amplification of sounds as a function of frequency.

In embodiments in which the tracking module 350 determines a most recent geographical location associated with a physical object using one or more machine learning models, the model(s) may be trained by the machine learning training module 365. The machine learning model(s) may be trained to predict a likelihood that a physical object is associated with a sound. In some embodiments, the machine learning model(s) may be trained based on a set of attributes of sounds, such as one or more amplitudes, frequencies, wavelengths, and/or volumes of the sounds, whether the sounds are continuous or intermittent, or any other suitable attributes of sounds. For example, the machine learning training module 160 may receive a set of attributes of sounds associated with various physical objects, such that each sound may have one or more amplitudes, frequencies, wavelengths, and/or volumes, and may be continuous or intermittent, etc. Continuing with this example, for each sound, the machine learning training module 160 may receive a label identifying a physical object associated with the sound (e.g., by prompting the user for this information or by accessing this information from one or more web pages, catalogs of sounds, etc. stored in the data store 335). In the above example, the machine learning training module 365 may then train the machine learning model(s) based on the set of attributes and the label for each sound. Once trained, the machine learning model(s) may be stored in the data store 335. A machine learning model may be retrained periodically or as new training data becomes available. For example, a machine learning model may be retrained each time a user provides information identifying a physical object associated with a sound, each time a catalog of sounds is received or updated, etc. and the retrained model may then be stored in the data store 335.

Figure 4:
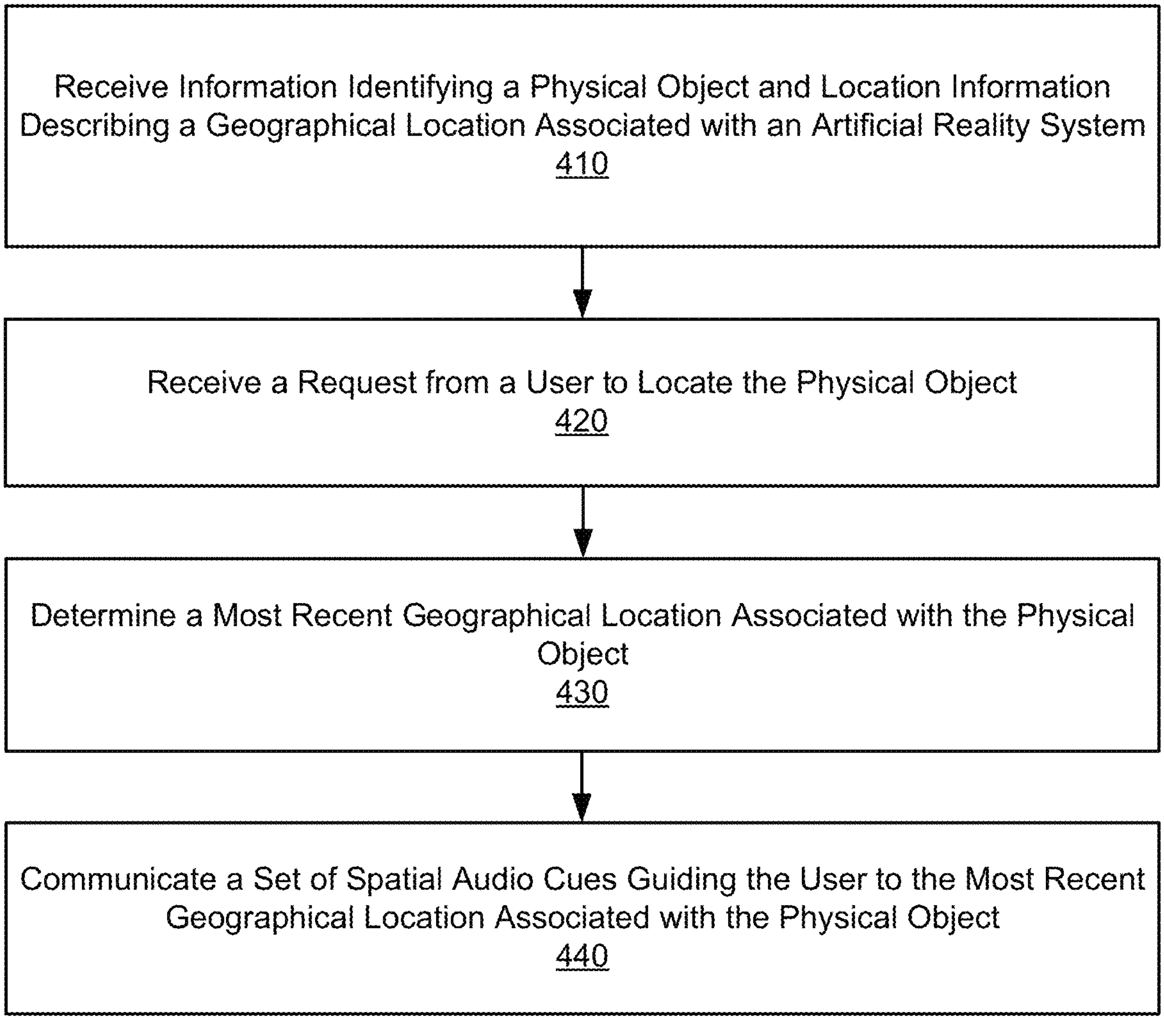
FIG. 4 is a flowchart of a method for guiding a user of an artificial reality system to a physical object having a trackable feature using spatial audio cues, in accordance with one or more embodiments.

FIG. 4 is a flowchart of a method for guiding a user of an artificial reality system 102 to a physical object having a trackable feature using spatial audio cues, in accordance with one or more embodiments. The process shown in FIG. 4 may be performed by components of an artificial reality system (e.g., artificial reality system 102). Other entities may perform some or all of the steps in FIG. 4 in other embodiments. Embodiments may include different and/or additional steps, or perform the steps in different orders.

The artificial reality system 102 receives 410 (e.g., via the DCA 145, the audio system 150, and/or the I/O interface 110) information identifying a physical object, in which the information identifying the physical object includes one or more trackable features associated with the physical object. The physical object may be any type of physical object, such as a clothing item, an accessory, an electronic item, a food item, a book, a vehicle, an appliance, a furniture item, etc. Information identifying the physical object may include an identifier (e.g., a name) associated with the physical object, information describing the physical object (e.g., type, size, dimension(s), color(s), etc.), the trackable feature(s) associated with the physical object, and/or any other suitable types of information.

The trackable feature(s) associated with the physical object may include: a physical beacon device coupled to the physical object, one or more depictions of the physical object (e.g., in one or more images or videos), one or more sounds (e.g., a sound signature) associated with the physical object, and/or any other suitable types of features. For example, if the physical object (e.g., a set of keys or a phone) is coupled to a physical beacon device, information identifying the physical object may include a name of the physical object (e.g., "keys" or "phone") and information describing the physical beacon device. In this example, information describing the physical beacon device may include a technology used by the physical beacon device (e.g., Bluetooth, GPS, ultra-wideband (UWB), etc.), a brand name, a model number, a unique serial number or a user account associated with the physical beacon device, etc. In the above example, the information identifying the physical object also or alternatively may include one or more depictions of the physical object (e.g., in one or more images and/or portions of one or more videos captured by the DCA 145). Furthermore, in the above example, the information identifying the physical object also or alternatively may include one or more sounds associated with the physical object (e.g., a sound signature corresponding to a jangling sound associated with a set of keys or a ringtone associated with a phone captured by the audio system 150). In some embodiments, once the artificial reality system 102 receives 410 the information identifying the physical object, this information may be stored (e.g., in data store 155 or data store 335).

The information identifying the physical object may be received 410 from a user of the artificial reality system 102, a third-party system 180, or any other suitable source. For example, when an image or a video depicting the physical object is received 410 by the artificial reality system 102 (e.g., by the DCA 145), the artificial reality system 102 may send (e.g., via the display assembly 130) a prompt to the user to identify the physical object. In this example, information identifying the physical object received 410 (e.g., via the I/O interface 110) from the user may then be stored in association with the image or video (e.g., in data store 155). As an additional example, when a sound associated with the physical object is received 410 by the artificial reality system 102 (e.g., via the audio system 150), the artificial reality system 102 may send (e.g., via the display assembly 130) a prompt to the user to identify the physical object. In this example, information identifying the physical object received 410 (e.g., via the I/O interface 110) from the user may then be stored in association with the sound (e.g., in data store 335). As yet another example, information identifying the physical object may be included in a catalog of physical objects or sounds or in one or more images, videos, or audio clips included in one or more web pages received 410 from a third-party system 180.

Figure 5A:
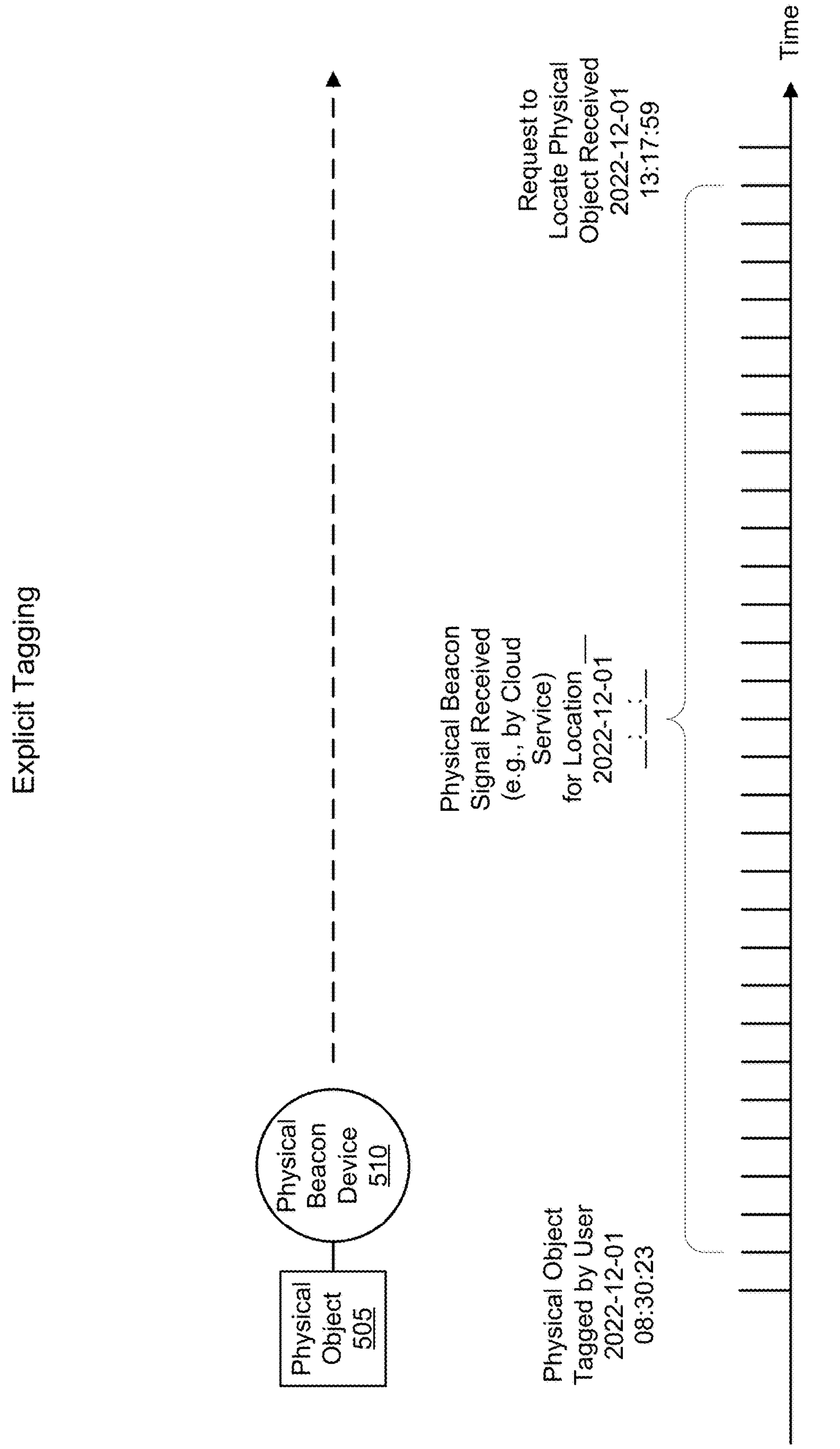
FIG. 5A illustrates an example of determining a most recent geographical location associated with a physical object explicitly tagged based on a physical beacon device coupled to the physical object, in accordance with one or more embodiments.

In some embodiments, information identifying the physical object may be received 410 when the physical object is explicitly tagged. The physical object may be explicitly tagged based on the trackable feature(s) associated with the physical object. In embodiments in which the physical object is explicitly tagged, information identifying the physical object may be received 410 in association with a request from the user of the artificial reality system 102 to tag the physical object with a physical beacon device. FIG. 5A illustrates an example of determining a most recent geographical location associated with a physical object 505 explicitly tagged based on a physical beacon device 510 coupled to the physical object 505, in accordance with one or more embodiments. As shown in the example of FIG. 5A, the physical object 505 may be explicitly tagged when a request is received (e.g., via the I/O interface 110) from the user to tag the physical object 505 so that it may be located at a later time using a physical beacon device 510, in which the request includes information describing the physical beacon device 510 and a name or other identifier associated with the physical object 505 to which the physical beacon device 510 is attached. In this example, the information describing the physical beacon device 510 may then be stored in the artificial reality system 102 (e.g., in data store 155) in association with the name/identifier associated with the physical object 505, information indicating the physical object 505 has been tagged, and information describing a time at which the physical object 505 was tagged.

Figure 5B:
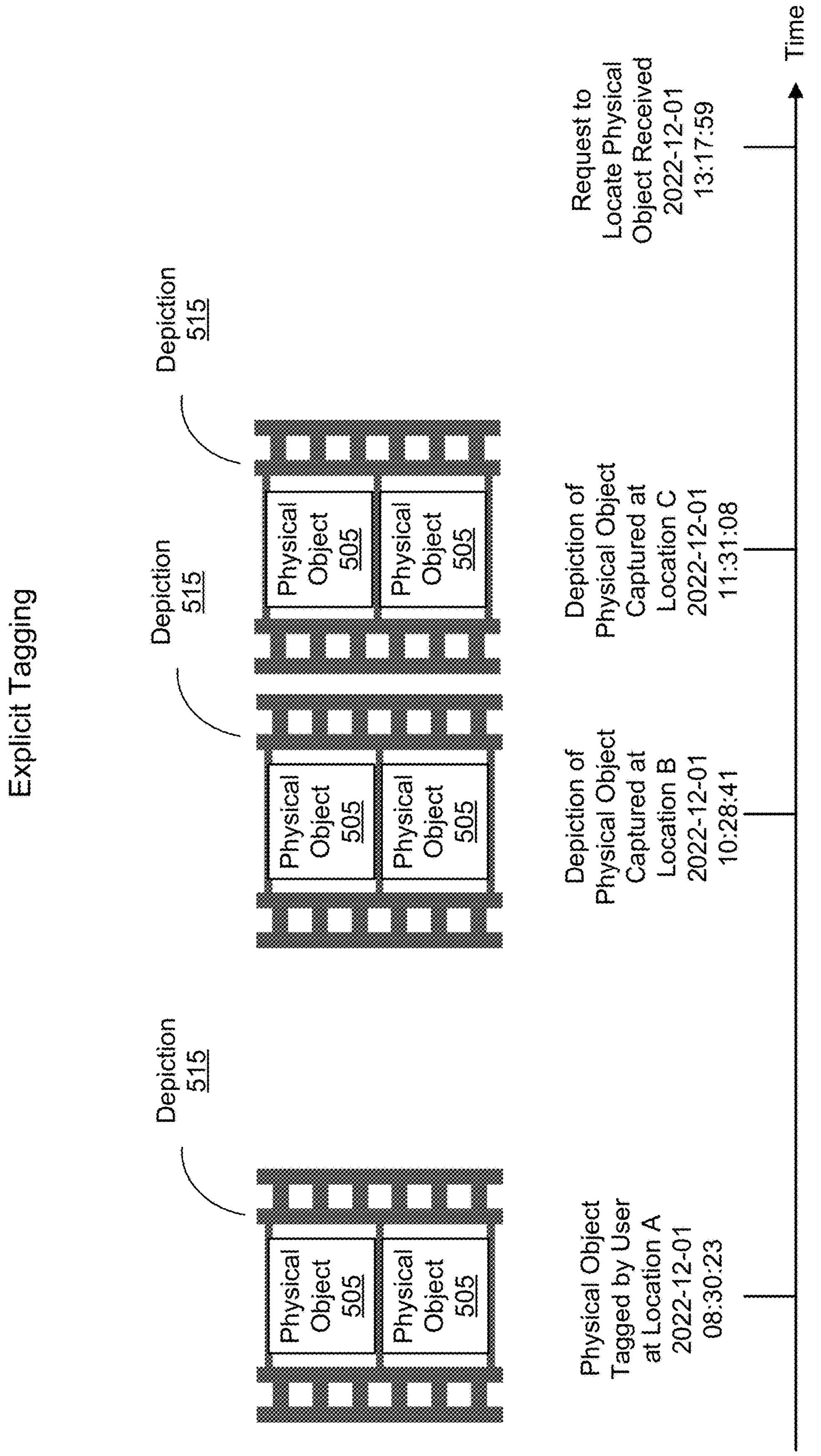
FIG. 5B illustrates an example of determining a most recent geographical location associated with a physical object explicitly tagged based on a depiction of the physical object, in accordance with one or more embodiments.

In embodiments in which the physical object 505 is explicitly tagged, information identifying the physical object 505 also may be received 410 in association with a request from the user to tag the physical object 505 based on a depiction of the physical object 505 (e.g., in an image or a video received 410 via the DCA 145) or a sound associated with the physical object 505 (e.g., a sound signature received via the audio system 150). FIG. 5B illustrates an example of determining a most recent geographical location associated with a physical object 505 explicitly tagged based on a depiction 515 of the physical object 505, in accordance with one or more embodiments. As shown in the example of FIG. 5B, if an image or a video depicting the physical object 505 is presented to the user (e.g., via the display assembly 130), the physical object 505 may be explicitly tagged when a request is received from the user (e.g., via the I/O interface 110) to tag the physical object 505 so that it may be located at a later time, in which the request identifies the physical object 505 depicted within the image or the video. In this example, the image or a portion of the video (e.g., one or more frames of the video) in which the physical object 505 is depicted may then be stored in the artificial reality system 102 (e.g., in data store 155). In the above example, the image or the portion of the video may be stored in association with information identifying the physical object 505, information indicating the physical object 505 has been tagged, a time associated with the depiction 515, and/or any other suitable types of information that may be stored in association with the depiction 515.

Figure 5C:
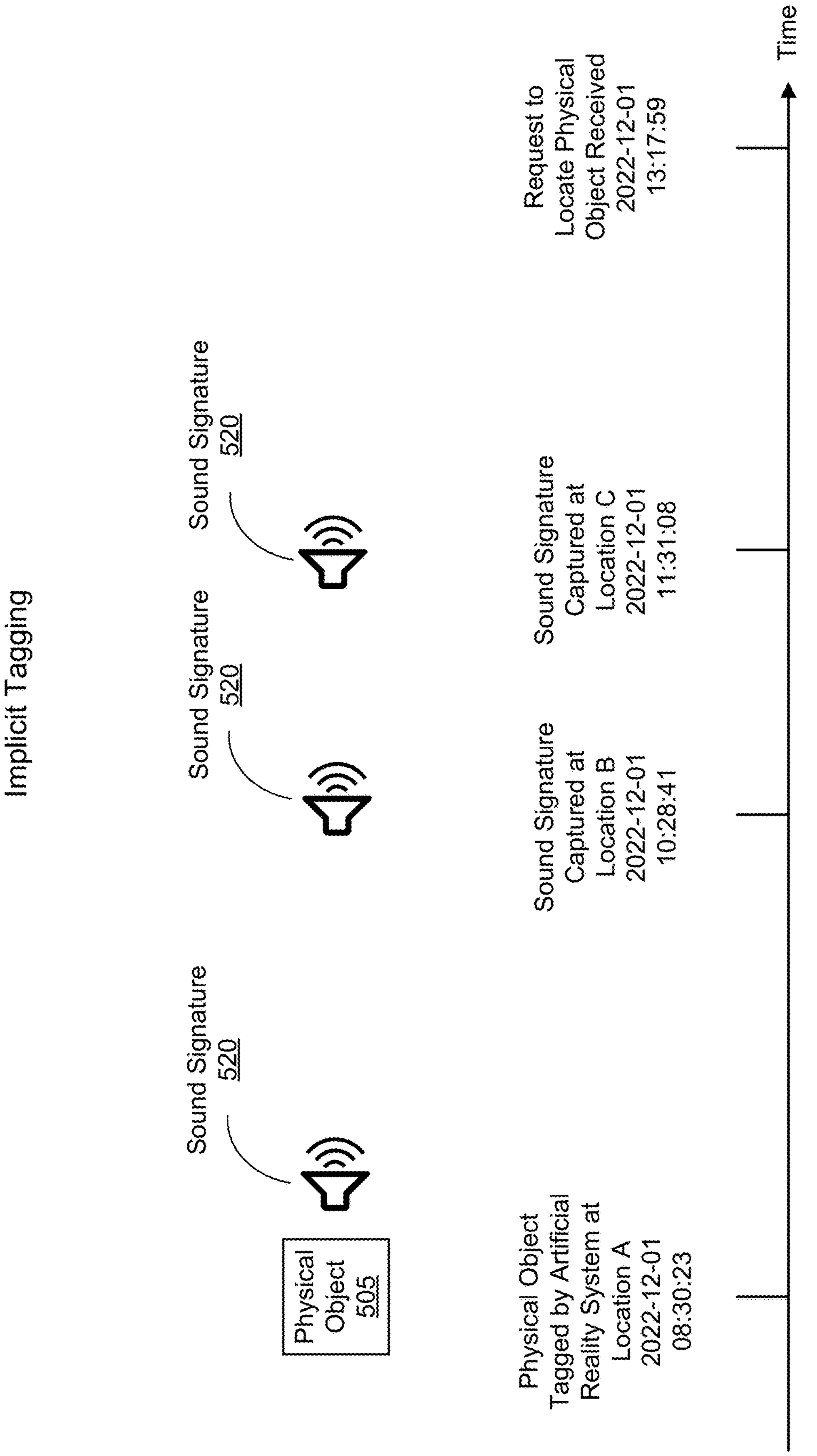
FIG. 5C illustrates an example of determining a most recent geographical location associated with a physical object implicitly tagged based on a sound associated with the physical object, in accordance with one or more embodiments.

In various embodiments, information identifying the physical object 505 may be received 410 when the physical object 505 is implicitly tagged. Similar to embodiments in which the physical object 505 is explicitly tagged, the physical object 505 may be implicitly tagged based on the trackable feature(s) associated with the physical object 505. In embodiments in which the physical object 505 is implicitly tagged, information identifying the physical object 505 may be received 410 absent a request from the user to tag the physical object 505. In some embodiments, the physical object 505 may be implicitly tagged by the artificial reality system 102 when it determines (e.g., using tracking module 170 or tracking module 350) that the physical object 505 is depicted in an image or a video or is associated with a sound. FIG. 5C illustrates an example of determining a most recent geographical location associated with a physical object 505 implicitly tagged based on a sound associated with the physical object 505, in accordance with one or more embodiments. As shown in the example of FIG. 5C, if a sound, such as a sound signature 520, is associated with the physical object 505, the artificial reality system 102 may determine that the physical object 505 is associated with the sound signature 520 and tag the physical object 505 so that it may be located at a later time. In this example, the artificial reality system 102 may then store the sound signature 520 with which the physical object 505 is associated in the artificial reality system 102 (e.g., in data store 335). In the above example, the sound signature 520 may be stored in association with information identifying the physical object 505, information indicating the physical object 505 has been tagged, a time associated with the sound signature 520, and/or any other suitable types of information that may be stored in association with the sound signature 520.

In addition to the information identifying the physical object 505, the artificial reality system 102 also receives 410 (e.g., via the position sensor(s) 140) information describing a geographical location associated with the artificial reality system 102 (e.g., information describing a geographical location of the client device 105). In some embodiments, the artificial reality system 102 may receive 410 this information in association with information describing an orientation associated with the artificial reality system 102 (e.g., information describing an orientation of the client device 105). For example, the artificial reality system 102 may receive (in step 410) latitude and longitude coordinates for the artificial reality system 102 and information describing a direction that the artificial reality system 102 is facing and a tilt of the artificial reality system 102 relative to the ground. In various embodiments, the artificial reality system 102 also may receive 410 this information in association with information describing sources of sounds within the local area, depth information for a portion of the local area, or any other suitable types of information. For example, if the trackable feature(s) associated with the physical object 505 include(s) one or more depictions 515 of the physical object 505, the artificial reality system 102 may receive 410 information describing the orientation and the geographical location associated with the artificial reality system 102 and depth information for a portion of the local area (e.g., generated by the DCA 145) when each depiction 515 was captured. As an additional example, if the trackable feature (s) associated with the physical object 505 include(s) one or more sounds associated with the physical object 505, the artificial reality system 102 may receive 410 information describing the orientation and the geographical location associated with the artificial reality system 102 when each sound was captured and information describing a source of each sound within the local area (e.g., determined by the DOA estimation module 340) when the sound was captured.

In embodiments in which the information identifying the physical object 505 includes image data, video data, and/or audio data, the data may be stored in the artificial reality system 102 (e.g., in data store 155 or data store 335) in association with various types of information associated with the data. Examples of such information include: information describing times at which the data were captured, information describing orientations and/or geographical locations associated with the artificial reality system 102 when the data were captured, information identifying physical objects 505 depicted in or associated with the data, depth information for a portion of the local area that is depicted, information describing sources of sounds within the local area, or any other suitable types of information. For example, an image, a portion of a video (e.g., one or more frames of the video), or a sound may be stored (e.g., in data store 155 or data store 335) in association with a timestamp indicating a date and time of day at which it was captured. In this example, the image, portion of the video, or sound also may be stored in association with information describing a direction that the artificial reality system 102 was facing, a tilt of the artificial reality system 102 relative to the ground, and GPS coordinates for the artificial reality system 102 when it was captured. In the above example, the image or portion of the video also may be stored in association with information identifying one or more physical objects 505 (e.g., a phone, a set of keys, a clothing item, etc.) that is/are depicted and depth information for a portion of the local area that is depicted. Furthermore, in the above example, the sound also may be stored in association with information identifying one or more physical objects 505 that is/are associated with the sound and/or information describing a source of the sound within the local area.

In some embodiments, the artificial reality system 102 may determine (e.g., using tracking module 170 or tracking module 350) whether the physical object 505 is depicted in image or video, and/or whether the physical object 505 is associated with a sound included in audio data as the data are captured by the artificial reality system 102 (e.g., by the DCA 145 and/or the audio system 150). The artificial reality system 102 may do so based on information stored in the artificial reality system 102 (e.g., in data store 155 or data store 335) or by using one or more machine learning models. For example, the artificial reality system 102 may compare live video to images and/or videos of the physical object 505 (e.g., stored in data store 155) or live audio to sounds associated with the physical object 505 (e.g., stored in data store 335) and determine whether the physical object 505 is depicted in the live video or is associated with a sound included in the live audio based on the comparison. Alternatively, in the above example, the artificial reality system 102 may access one or more machine learning models trained to predict a likelihood that the physical object 505 is depicted in an image or a video or is associated with a sound. In this example, the artificial reality system 102 may then apply the model(s) to a set of attributes of a portion of the live video (e.g., one or more frames of the live video) or a set of attributes of a sound included in the live audio. Continuing with this example, the artificial reality system 102 may then determine whether the physical object 505 is depicted in the live video or associated with a sound included in the live audio based on an output received from the model(s).

If the artificial reality system 102 determines that the physical object 505 is depicted in live video data or is associated with a sound included in live audio data, it may store information identifying the physical object 505 in association with various types of information (e.g., in data store 155 or data store 335). In the above example, if the artificial reality system 102 stores video data or audio data as the data are captured, the data may be stored in association with information identifying the physical object 505 and information describing a time associated with each depiction 515 of the physical object 505 or each sound associated with the physical object 505. In the above example, the data also may be stored in association with information describing an orientation and a geographical location associated with the artificial reality system 102 (e.g., received 410 from the position sensor(s) 140) each time the physical object 505 was depicted or each time the sound associated with the physical object 505 was captured. In this example, the data further may be stored in association with depth information for a portion of the local area (e.g., generated by the DCA 145) each time the physical object 505 was depicted or information describing a source of the sound associated with the physical object 505 within the local area (e.g., determined by the DOA estimation module 340) each time the sound was captured.

As described above, in some embodiments, the artificial reality system 102 may determine whether the physical object 505 is depicted in image data or video data or is associated with a sound included in audio data using one or more machine learning models, which may be trained by the artificial reality system 102 (e.g., using machine learning training module 160 or machine learning training module 365). To use the machine learning model(s), the artificial reality system 102 may access (e.g., using tracking module 170 or tracking module 350) the machine learning model(s) (e.g., from data store 155 or data store 335) and apply (e.g., using tracking module 170 or tracking module 350) the model(s) to a set of attributes of a depiction 515 or a sound. For example, suppose that the physical object 505 is depicted in an image or a video. In this example, the artificial reality system 102 may access the machine learning model (s) and apply the model(s) to one or more dimensions, edges, angles, surfaces, contours, colors, and/or images included in the image or a portion of the video (e.g., one or more frames of the video), text included in the image or the portion of the video, etc. As an additional example, suppose that the physical object 505 is associated with a sound. In this example, the artificial reality system 102 may access the machine learning model(s) and apply the model(s) to one or more amplitudes, frequencies, wavelengths, and/or volumes of the sound, information indicating whether the sound is continuous or intermittent, etc. The artificial reality system 102 may then receive an output indicating a predicted likelihood that the physical object 505 is depicted or is associated with the sound, and the artificial reality system 102 may determine whether the physical object 505 is depicted or is associated with the sound based on the predicted likelihood. For example, if the output indicates there is an 80% likelihood that the physical object 505 is depicted in an image or a portion of a video or is associated with a sound, the artificial reality system 102 may determine that the physical object 505 is depicted or is associated with the sound if the predicted likelihood is at least a threshold likelihood.

In embodiments in which the artificial reality system 102 determines the physical object 505 is depicted in image or video data as the data are captured, the artificial reality system 102 also may determine (e.g., using tracking module 170) a geographical location associated with the physical object 505. The artificial reality system 102 may make this determination based on information describing the orientation and the geographical location associated with the artificial reality system 102 when the image or video data were captured and depth information for a portion of the local area depicted in the image or video data. For example, if the physical object 505 is depicted in live video, the artificial reality system 102 may determine a geographical location associated with the physical object 505 based on information describing a current orientation and a current geographical location associated with the artificial reality system 102 (e.g., received from the position sensor(s) 140) and current depth information for a portion of the local area (e.g., generated by the DCA 145). The artificial reality system 102 may then store information describing the geographical location associated with the physical object 505 in association with the image or video data in which the physical object 505 is depicted. In the above example, the artificial reality system 102 may store information describing the geographical location (e.g., latitude and longitude coordinates) associated with the physical object 505 (e.g., in data store 155) in association with the live video.

In embodiments in which the artificial reality system 102 determines a sound included in audio data is associated with the physical object 505 as the data are captured, the artificial reality system 102 also may determine (e.g., using tracking module 350) a geographical location associated with the physical object 505. The artificial reality system 102 may make this determination based on information describing the orientation and the geographical location associated with the artificial reality system 102 and information describing a source of the sound within the local area when the audio data were captured. For example, if the physical object 505 is associated with a sound included in live audio, the artificial reality system 102 may determine a geographical location associated with the physical object 505 based on information describing a current orientation and a current geographical location associated with the artificial reality system 102 (e.g., received from the position sensor(s) 140) and a current source of the sound within the local area (e.g., determined by the DOA estimation module 340). The artificial reality system 102 may then store information describing the geographical location associated with the physical object 505 in association with the audio data in which the sound associated with the physical object 505 is included. In the above example, the artificial reality system 102 may store information describing the geographical location (e.g., latitude and longitude coordinates) associated with the physical object 505 (e.g., in data store 335) in association with the live audio.

Referring back to FIG. 4, the artificial reality system 102 then receives 420 (e.g., via the I/O interface 110) a request from the user to locate the physical object 505. For example, suppose that the artificial reality system 102 receives 420 an action request from the user corresponding to an instruction to locate the physical object 505. In this example, the physical object 505 may be identified in the request based on a name associated with the physical object 505, a trackable feature associated with the physical object 505, or any other suitable information identifying the physical object 505.

The artificial reality system 102 then determines 430 (e.g., using tracking module 170) a most recent geographical location associated with the physical object 505. In some embodiments, the artificial reality system 102 may do so using a physical beacon device 510 associated with the physical object 505. In such embodiments, the physical beacon device 510 may send a wireless signal (e.g., via Bluetooth) that may be used to determine its geographical location. The physical beacon device 510 may send the signal at periodic intervals (e.g., every 15 minutes), based on its proximity to other devices (e.g., whether it is close enough to establish a Bluetooth connection), or in response to receiving a request for its geographical location. Furthermore, the geographical location of the physical beacon device 510 may be determined using any technique or combination of techniques. For example, as shown in FIG. 5A, information describing a geographical location of the physical beacon device 510 may be sent to a cloud service (e.g., by nearby client devices 105 in a crowdsourced network that triangulate its geographical location based on a strength of a secure Bluetooth signal sent by the physical beacon device 510 detected by the client devices 105). In this example, the artificial reality system 102 may determine 430 the most recent geographical location associated with the physical object 505 by forwarding (e.g., via the network 120) the request to locate the physical object 505 received 420 from the user to the cloud service for information describing the most recent geographical location of the physical beacon device 510. In this example, the artificial reality system 102 may determine 430 the most recent geographical location associated with the physical object 505 based on information included in a response to the request.

The artificial reality system 102 also may determine 430 the most recent geographical location associated with the physical object 505 based at least in part on a depiction 515 of the physical object 505 most recently captured by the artificial reality system 102 (e.g., by the DCA 145). To make this determination, the artificial reality system 102 may first identify the depiction 515 of the physical object 505 most recently captured by the artificial reality system 102 by determining whether the physical object 505 is depicted in image or video data as the image or video data are captured, as described above. In various embodiments, the artificial reality system 102 also may identify the depiction 515 of the physical object 505 most recently captured by the artificial reality system 102 by accessing image and/or video data (e.g., stored in data store 155) and determining a most recent time associated with image data or a portion of video data depicting the physical object 505. In such embodiments, the artificial reality system 102 may determine whether the physical object 505 is depicted in image and/or video data that was most recently captured (e.g., based on information stored in data store 155 or by using one or more machine learning models) and, if necessary, repeating the process for image and/or video data captured at progressively earlier times until a depiction 515 of the physical object 505 most recently captured is identified. For example, based on information describing a time of capture stored in association with one or more images and/or videos (e.g., in data store 155), the artificial reality system 102 may access an image or a portion of a video (e.g., one or more frames of the video) associated with a most recent time and determine whether the physical object 505 is depicted in the image or the portion of the video by comparing it to images and/or videos of the physical object 505 (e.g., stored in data store 155). Alternatively, in the above example, the artificial reality system 102 may access one or more machine learning models trained to predict a likelihood that the physical object 505 is depicted in an image or a video and apply the model(s) to a set of attributes of the image or the portion of the video and determine whether the physical object 505 is depicted in the image or the portion of the video based on an output received from the model(s). Continuing with the above example, if the artificial reality system 102 determines that the physical object 505 is not depicted in the image or the portion of the video, the artificial reality system 102 may then repeat the process with images or portions of a video associated with progressively earlier times until it is able to identify a depiction 515 of the physical object 505 most recently captured.

Upon identifying the depiction 515 of the physical object 505 most recently captured by the artificial reality system 102, the artificial reality system 102 may determine 430 the most recent geographical location associated with the physical object 505. In some embodiments, the artificial reality system 102 may do so based on information describing the orientation and the geographical location associated with the artificial reality system 102 and depth information for a portion of the local area associated with the depiction 515. For example, suppose that the depiction 515 of the physical object 505 most recently captured by the artificial reality system 102 is an image or a portion of a video stored in the artificial reality system 102 and that the artificial reality system 102 determines whether the physical object 505 is depicted in image or video data as the image or video data are captured. In this example, if the artificial reality system 102 previously determined a geographical location associated with the physical object 505, the artificial reality system 102 may retrieve information describing the geographical location stored in association with the image or the portion of the video and determine 430 the most recent geographical location associated with the physical object 505 corresponding to the retrieved geographical location. Alternatively, in the above example, suppose that the artificial reality system 102 did not previously determine the geographical location associated with the physical object 505. In this example, the artificial reality system 102 may retrieve information stored in association with the image or the portion of the video describing the orientation and the geographical location associated with the artificial reality system 102 and depth information for the portion of the local area depicted in the image or the portion of the video and determine 430 the most recent geographical location associated with the physical object 505 based on the retrieved information. As shown in the example of FIG. 5B, the artificial reality system 102 may identify the depiction 515 of the physical object 505 captured at 11:31:08 on Dec. 1, 2022 to be the depiction 515 most recently captured and determine 430 the most recent geographical location associated with the physical object 505 to be Location C since this is the geographical location associated with the physical object 505 at that time. As an additional example, if the depiction 515 of the physical object 505 most recently captured is in live video, the artificial reality system 102 may determine 430 the most recent geographical location associated with the physical object 505 based on information describing a current orientation and a current geographical location associated with the artificial reality system 102 (e.g., received from the position sensor(s) 140) and current depth information for a portion of the local area (e.g., generated by the DCA 145).

The artificial reality system 102 also may determine 430 (e.g., using tracking module 350) the most recent geographical location associated with the physical object 505 based at least in part on a sound associated with the physical object 505 most recently captured by the artificial reality system 102 (e.g., by the audio system 150). To make this determination, the artificial reality system 102 may first identify the sound associated with the physical object 505 most recently captured by the artificial reality system 102 by determining whether the physical object 505 is associated with a sound included in audio data as the audio data are captured, as described above. In various embodiments, the artificial reality system 102 also may identify the sound associated with the physical object 505 most recently captured by the artificial reality system 102 by accessing audio data (e.g., stored in data store 335) and determining a most recent time associated with a sound associated with the physical object 505. In such embodiments, the artificial reality system 102 may determine whether the physical object 505 is associated with a sound that was most recently captured (e.g., based on information stored in data store 335 or by using one or more machine learning models) and, if necessary, repeating the process for sounds captured at progressively earlier times until a sound associated with the physical object 505 most recently captured is identified. For example, based on information describing a time of capture stored in association with one or more sounds (e.g., in data store 335), the artificial reality system 102 may access a sound associated with a most recent time and determine whether the physical object 505 is associated with the sound by comparing it to sounds associated with the physical object 505 (e.g., stored in data store 335). Alternatively, in the above example, the artificial reality system 102 may access one or more machine learning models trained to predict a likelihood that the physical object 505 is associated with a sound and apply the model(s) to a set of attributes of the sound and determine whether the physical object 505 is associated with the sound based on an output received from the model(s). Continuing with the above example, if the artificial reality system 102 determines that the physical object 505 is not associated with the sound, the artificial reality system 102 may then repeat the process with sounds associated with progressively earlier times until it is able to identify a sound associated with the physical object 505 most recently captured.

Upon identifying the sound associated with the physical object 505 most recently captured by the artificial reality system 102, the artificial reality system 102 may determine 430 the most recent geographical location associated with the physical object 505. In some embodiments, the artificial reality system 102 may do so based on information describing the orientation and the geographical location associated with the artificial reality system 102 and information describing a source of the sound within the local area. For example, suppose that the sound associated with the physical object 505 most recently captured by the artificial reality system 102 is a sound stored in the artificial reality system 102, and that the artificial reality system 102 determines whether the physical object 505 is associated with a sound included in audio data as the audio data are captured. In this example, if the artificial reality system 102 previously determined a geographical location associated with the physical object 505, the artificial reality system 102 may retrieve information describing the geographical location stored in association with the sound and determine 430 the most recent geographical location associated with the physical object 505 corresponding to the retrieved geographical location. Alternatively, in the above example, suppose that the artificial reality system 102 did not previously determine the geographical location associated with the physical object 505. In this example, the artificial reality system 102 may retrieve information stored in association with the sound describing the orientation and the geographical location associated with the artificial reality system 102 and information describing a source of the sound within the local area when the sound was captured and determine 430 the most recent geographical location associated with the physical object 505 based on the retrieved information. As shown in the example of FIG. 5C, the artificial reality system 102 may identify the sound signature 520 associated with the physical object 505 captured at 11:31:08 on Dec. 1, 2022 to be the sound associated with the physical object 505 most recently captured and determine 430 the most recent geographical location associated with the physical object 505 to be Location C since this is the geographical location associated with the physical object 505 at that time. As an additional example, if the sound associated with the physical object 505 most recently captured is in live audio, the artificial reality system 102 may determine 430 the most recent geographical location associated with the physical object 505 based on information describing a current orientation and a current geographical location associated with the artificial reality system 102 (e.g., received from the position sensor(s) 140) and information describing a current source of the sound within the local area (e.g., determined by the DOA estimation module 340).

The artificial reality system 102 may then generate (e.g., using the engine 175) a set of instructions guiding the user of the artificial reality system 102 to the most recent geographical location associated with the physical object 505. The artificial reality system 102 may generate the set of instructions based on a current orientation and a current geographical location associated with the artificial reality system 102 and the most recent geographical location associated with the physical object 505. For example, once the artificial reality system 102 has determined 430 the most recent geographical location associated with the physical object 505, the artificial reality system 102 may receive information describing a current orientation and a current geographical location associated with the artificial reality system 102 (e.g., from the position sensor(s) 140). In this example, based on the received information and the most recent geographical location associated with the physical object 505, the artificial reality system 102 may generate a set of instructions guiding the user from their current geographical location to the most recent geographical location associated with the physical object 505. In some embodiments, the artificial reality system 102 also may generate the set of instructions based on information describing the local area of the artificial reality system 102. In the above example, the artificial reality system 102 also may access a current configuration of the local area of the artificial reality system 102 (e.g., from the mapping server 125) and generate the set of instructions based on the current configuration of the local area.

The set of instructions generated by the artificial reality system 102 may guide the user to the most recent geographical location associated with the physical object 505 using visual signals, audio signals (e.g., spatial audio cues), haptic feedback, and/or using any other suitable means. In embodiments in which the set of instructions generated by the artificial reality system 102 includes a set of spatial audio cues, the set of spatial audio cues may be a spatialized sound beacon that guides the user based on a proximity of the user to the most recent geographical location associated with the physical object 505 by changing in volume, pitch, depth, etc. as the user gets closer to the location. Similarly, in embodiments in which the set of instructions generated by the artificial reality system 102 includes haptic feedback, the haptic feedback may guide the user based on a proximity of the user to the most recent geographical location associated with the physical object 505.

Referring once more to FIG. 4, the artificial reality system 102 then communicates 440 (e.g., using the display assembly 130, the transducer array 310, and/or the I/O interface 110) the set of instructions to the user. For example, the artificial reality system 102 may communicate (in step 440) audio and/or visual turn-by-turn instructions guiding the user to the most recent geographical location associated with the physical object 505. As an additional example, the artificial reality system 102 may communicate 440 a set of spatial audio cues to the user in the form of a spatialized sound beacon that becomes louder as the user approaches or faces the most recent geographical location associated with the physical object 505 and becomes quieter as the user moves or faces away from it. As yet another example, the artificial reality system 102 may communicate 440 haptic feedback to the user that vibrates more frequently as the user approaches or faces the most recent geographical location associated with the physical object 505 and vibrates less frequently as the user moves or faces away from it. In some embodiments, the artificial reality system 102 may communicate 440 the set of instructions to the user in association with additional types of information that may help guide the user to the most recent geographical location associated with the physical object 505. For example, the artificial reality system 102 also may communicate 440 the set of instructions in association with the depiction 515 of the physical object 505 most recently captured by the artificial reality system 102 or an audio clip including the sound associated with the physical object 505 most recently captured by the artificial reality system 102, a date and time of day at which the depiction 515/sound was captured, etc.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

receiving, at an artificial reality system, information identifying a physical object and location information describing a geographical location associated with the artificial reality system, wherein the information identifying the physical object comprises a trackable feature having a physical beacon device coupled to the physical object, such that the physical beacon device is capable of sending a wireless signal based on receiving a request from a user of the artificial reality system to establish a secure connection to the artificial reality system;

determining a most recent geographical location associated with the physical object based at least in part on the trackable feature having the physical beacon device and the location information; and communicating, to the user, a set of spatial audio cues guiding the user to the most recent geographical location associated with the physical object.

2. The method of claim 1, wherein receiving the information identifying the physical object comprises:

displaying video data captured by the artificial reality system to the user of the artificial reality system, wherein the video data depicts the physical object; and receiving the information identifying the physical object based at least in part on an input from the user identifying the physical object depicted within the video data, wherein the trackable feature associated with the physical object comprises a depiction of the physical object within the video data.

3. The method of claim 2, wherein determining the most recent geographical location associated with the physical object comprises:

determining a most recent time associated with a portion of the video data depicting the physical object; and determining the most recent geographical location associated with the physical object based at least in part on the location information associated with the portion of the video data.

4. The method of claim 1, wherein the trackable feature comprises a sound signature associated with the physical object.

5. The method of claim 4, further comprising:

accessing a machine learning model that is trained to predict a likelihood that an object is associated with a sound, wherein the machine learning model is trained by:

receiving a plurality of attributes of a plurality of sounds associated with a plurality of objects, receiving, for each sound of the plurality of sounds, a label identifying an object associated with the sound, and training the machine learning model based at least in part on the plurality of attributes and the label for each sound of the plurality of sounds.

6. The method of claim 5, wherein determining the most recent geographical location associated with the physical object comprises:

receiving the sound signature associated with the physical object;

applying the machine learning model to a plurality of attributes of the sound signature associated with the physical object to predict the likelihood that the sound signature is associated with the physical object; and determining the most recent geographical location associated with the physical object based at least in part on the predicted likelihood and the location information.

7. The method of claim 1, wherein the set of spatial audio cues comprises turn-by-turn directions.

8. The method of claim 1, wherein the set of spatial audio cues comprises a spatialized sound beacon.

9. The method of claim 8, wherein the spatialized sound beacon guides the user to the most recent geographical location associated with the physical object based on a proximity of the user to the most recent geographical location associated with the physical object.

10. The method of claim 1, wherein the physical beacon device is capable of sending the wireless signal in periodic intervals in response to receiving the request from the user.

11. A non-transitory computer-readable storage medium comprising stored instructions, the instructions when executed by a processor of a device, causing the device to:

receive, at an artificial reality system, information identifying a physical object and location information describing a geographical location associated with the artificial reality system, wherein the information identifying the physical object comprises a trackable feature having a physical beacon device coupled to the physical object, such that the physical beacon device is capable of sending a wireless signal based on receiving a request from a user of the artificial reality system to establish a secure connection to the artificial reality system;

determine a most recent geographical location associated with the physical object based at least in part on the trackable feature having the physical beacon device and the location information; and communicate, to the user, a set of spatial audio cues guiding the user to the most recent geographical location associated with the physical object.

12. The non-transitory computer-readable storage medium of claim 11, wherein the stored instructions to receive the information identifying the physical object further comprise stored instructions that, when executed, cause the device to:

display video data captured by the artificial reality system to the user of the artificial reality system, wherein the video data depicts the physical object; and receive the information identifying the physical object based at least in part on an input from the user identifying the physical object depicted within the video data, wherein the trackable feature associated with the physical object comprises a depiction of the physical object within the video data.

13. The non-transitory computer-readable storage medium of claim 12, wherein the stored instructions to determine the most recent geographical location associated with the physical object further comprise stored instructions that, when executed, cause the device to:

determine a most recent time associated with a portion of the video data depicting the physical object; and determine the most recent geographical location associated with the physical object based at least in part on the location information associated with the portion of the video data.

14. The non-transitory computer-readable storage medium of claim 11, wherein the trackable feature comprises a sound signature associated with the physical object.

15. The non-transitory computer-readable storage medium of claim 14, further comprising stored instructions that, when executed, cause the device to:

access a machine learning model that is trained to predict a likelihood that an object is associated with a sound, wherein the machine learning model is trained by:

receiving a plurality of attributes of a plurality of sounds associated with a plurality of objects, receiving, for each sound of the plurality of sounds, a label identifying an object associated with the sound, and training the machine learning model based at least in part on the plurality of attributes and the label for each sound of the plurality of sounds.

16. The non-transitory computer-readable storage medium of claim 15, wherein the stored instructions to determine the most recent geographical location associated with the physical object further comprise stored instructions that, when executed, cause the device to:

receive the sound signature associated with the physical object;

apply the machine learning model to a plurality of attributes of the sound signature associated with the physical object to predict the likelihood that the sound signature is associated with the physical object; and determine the most recent geographical location associated with the physical object based at least in part on the predicted likelihood and the location information.

17. The non-transitory computer-readable storage medium of claim 11, wherein the set of spatial audio cues comprises turn-by-turn directions.

18. The non-transitory computer-readable storage medium of claim 11, wherein the set of spatial audio cues comprises a spatialized sound beacon.

19. The non-transitory computer-readable storage medium of claim 18, wherein the spatialized sound beacon guides the user to the most recent geographical location associated with the physical object based on a proximity of the user to the most recent geographical location associated with the physical object.

20. The non-transitory computer-readable storage medium of claim 11, wherein the physical beacon device is capable of sending the wireless signal in periodic intervals in response to receiving the request from the user.

* * * * *